United States Patent
Sturniolo et al.

(12) 
(10) Patent No.: US 6,201,962 B1
(45) Date of Patent: Mar. 13, 2001

(54) SEAMLESS ROAMING AMONG MULTIPLE NETWORKS INCLUDING SEAMLESS TRANSITIONING BETWEEN MULTIPLE DEVICES

(75) Inventors: Emil A. Sturniolo, Medina; Frank D. Ciotti, Jr., Solon; Krishna P. Seshadri, Medina, all of OH (US)

(73) Assignee: Telxon Corporation, The Woodlands, TX (US)

( * ) Notice: Subject to any disclaimer, the term of this patent is extended or adjusted under 35 U.S.C. 154(b) by 0 days.

(21) Appl. No.: 08/957,256

(22) Filed: Oct. 24, 1997

Related U.S. Application Data

(63) Continuation-in-part of application No. 08/922,709, filed on Sep. 3, 1997, which is a continuation-in-part of application No. 08/856,122, filed on May 14, 1997.

(51) Int. Cl.[7] .................................................. H04Q 7/20
(52) U.S. Cl. .................. 455/432; 455/436; 455/507; 370/338
(58) Field of Search ................................. 455/403, 414, 455/416, 417, 422, 432, 436, 437, 438, 439, 442, 507, 517, 552, 556, 557, 560, 561; 370/331, 328, 338, 401

(56) References Cited

U.S. PATENT DOCUMENTS

| | | | |
|---|---|---|---|
| 4,837,800 | * | 6/1989 | Freeburg et al. ................... 455/557 |
| 4,912,756 | * | 3/1990 | Hop ...................................... 455/557 |
| 5,426,637 | | 6/1995 | Derby et al. . |
| 5,446,736 | | 8/1995 | Gleeson et al. . |
| 5,490,139 | | 2/1996 | Baker et al. . |
| 5,566,225 | * | 10/1996 | Haas ..................................... 455/423 |
| 5,572,528 | | 11/1996 | Shuen . |
| 5,574,774 | * | 11/1996 | Ahlberg et al. ...................... 455/422 |
| 5,664,007 | * | 9/1997 | Samadi et al. ....................... 455/442 |
| 5,752,185 | * | 5/1998 | Ahuja .................................. 455/414 |
| 5,796,727 | | 8/1998 | Harrison et al. . |
| 5,848,064 | | 12/1998 | Cowan . |
| 5,856,974 | | 1/1999 | Gervais et al. . |
| 5,889,816 | | 3/1999 | Agrawal et al. . |

* cited by examiner

*Primary Examiner*—Nay Maung
(74) *Attorney, Agent, or Firm*—Renner, Otto, Boisselle & Sklar, LLP

(57) ABSTRACT

The present invention relates to wireless communication systems involving multiple local area networks. A communication system according to the present invention includes a plurality of local area networks (LANs). Each of the LANs includes: a network backbone; and at least one access point coupled to the network backbone which, when a mobile terminal is registered to the access point, enables the mobile terminal to communicate wirelessly with a device on the network backbone via the at least one access point. When the mobile terminal is registered to at least one access point in one of the plurality of LANs the mobile terminal is assigned a first network address, and when the mobile terminal is registered to at least one access point in another of the plurality of LANs the mobile terminal is assigned a second network address in place of the first network address, the second network address being different from the first network address. The mobile communication system also includes a system backbone interconnecting the plurality of LANs for permitting communications between the plurality of LANs. Furthermore, the system includes a gateway controller, operatively coupled to one of the plurality of LANs, for serving as an intermediary for communications between the mobile terminal and a device on one of the system backbones in order that in the event the mobile terminal is assigned a different network address by virtue of registering with an access point in another of the LANs, the device is able to maintain communications with the mobile terminal without requiring knowledge of a change in the network address of the mobile terminal. In addition, the gateway controller permits sessions to be suspended temporarily and resumed using a different mobile terminal.

25 Claims, 19 Drawing Sheets

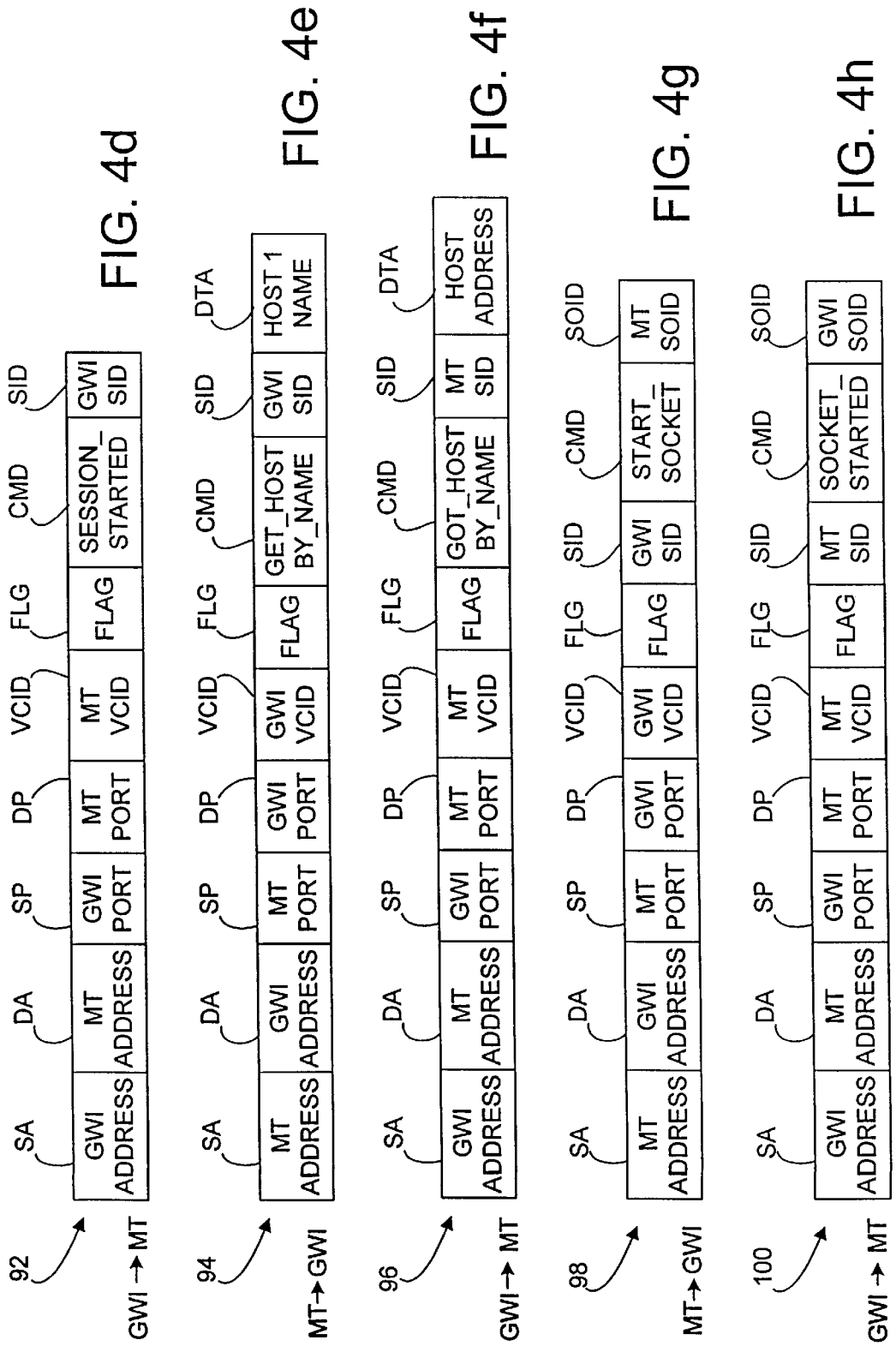

| | | MT SESSION 1 | GW SESSION 1 | MT SOCKET 1 | GW SOCKET 1 |
|---|---|---|---|---|---|
| MT VC$_1$ | GW VC$_1$ | MT SESSION 2 | GW SESSION 2 | MT SOCKET 2 | GW SOCKET 2 |
| | | ⋮ | ⋮ | • | • |
| | | MT SESSION L | GW SESSION L | • | • |
| MT VC$_2$ | GW VC$_2$ | • | • | • | • |
| ⋮ | ⋮ | ⋮ | ⋮ | ⋮ | ⋮ |
| MT VC$_n$ | GW VC$_n$ | • | • | • | • |

VIRTUAL CIRCUIT TABLE IN MT

FIG. 5a

| | | GW SESSION 1 | MT SESSION 1 | GW SOCKET 1 | MT SOCKET 1 |
|---|---|---|---|---|---|
| | | | | GW SOCKET 2 | MT SOCKET 2 |
| GW VC$_1$ | MT VC$_1$ | GW SESSION 2 | MT SESSION 2 | • | • |
| | | • | • | • | • |
| | | • | • | • | • |
| | | • | • | • | • |
| | | GW SESSION L | MT SESSION L | • | • |
| GW VC$_2$ | MT VC$_2$ | • | • | • | • |
| | | • | • | • | • |
| | | • | • | • | • |
| | | • | • | • | • |
| • | • | • | • | • | • |
| • | • | • | • | • | • |
| • | • | • | • | • | • |
| • | • | • | • | • | • |
| GW VC$_z$ | MT VC$_z$ | • | • | • | • |
| | | • | • | • | • |
| | | • | • | • | • |
| | | • | • | • | • |

*VIRTUAL CIRCUIT TABLE IN GW*

FIG. 5b

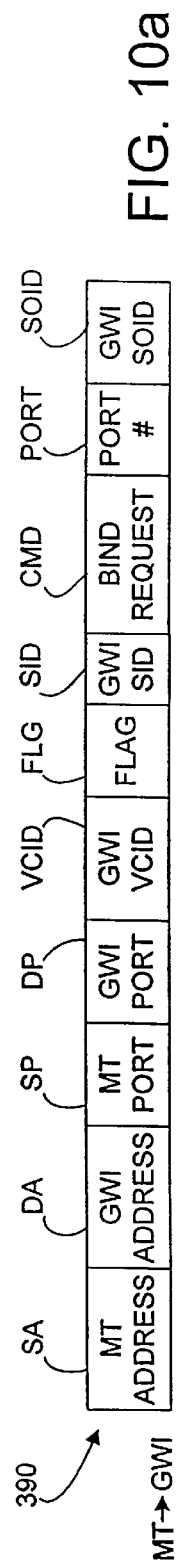
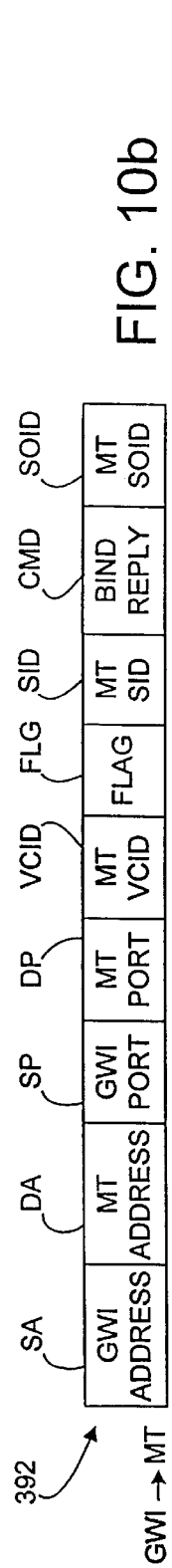
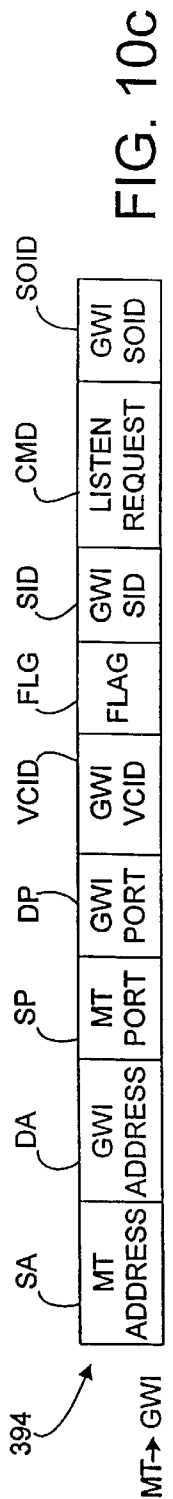
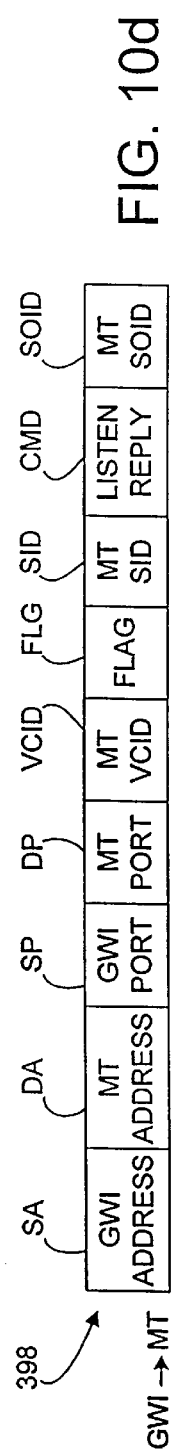
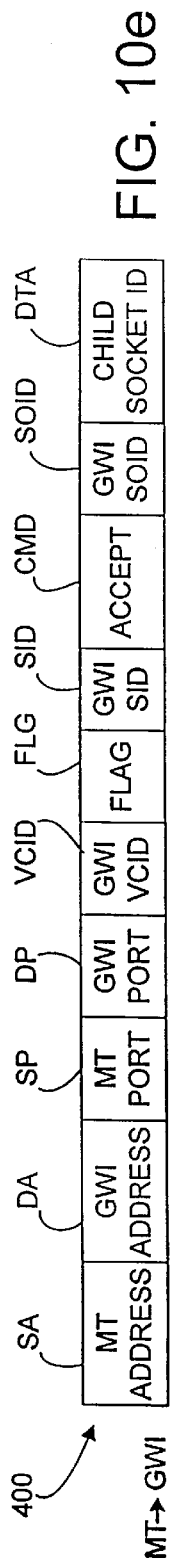

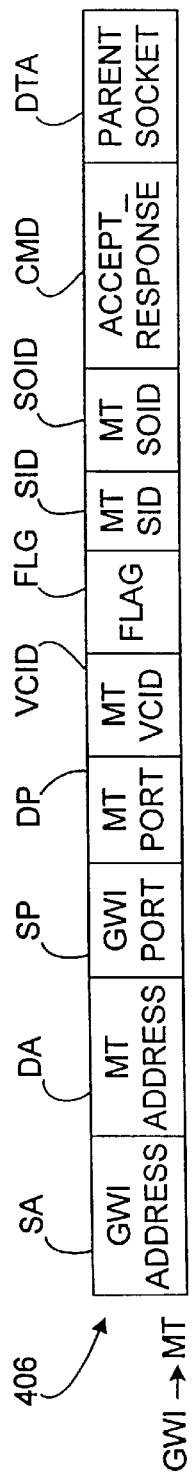
FIG. 10f
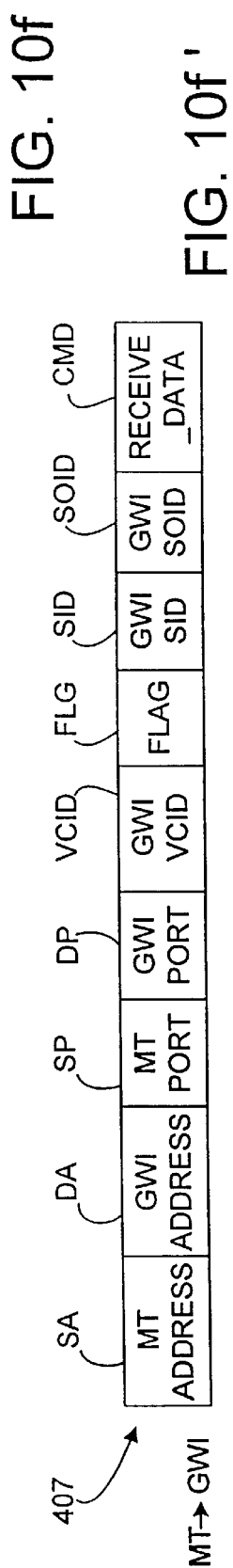
FIG. 10f'
FIG. 10g
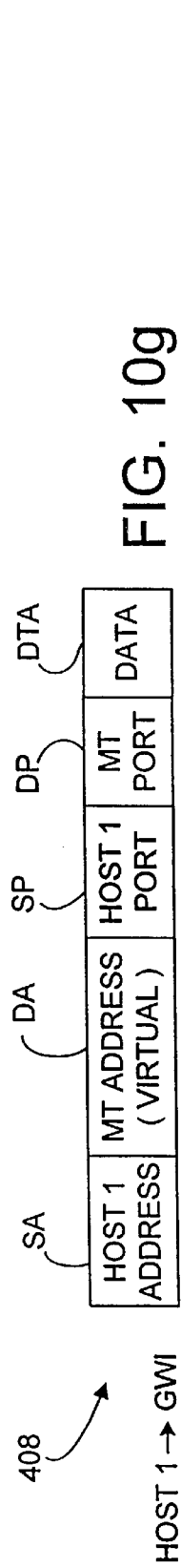
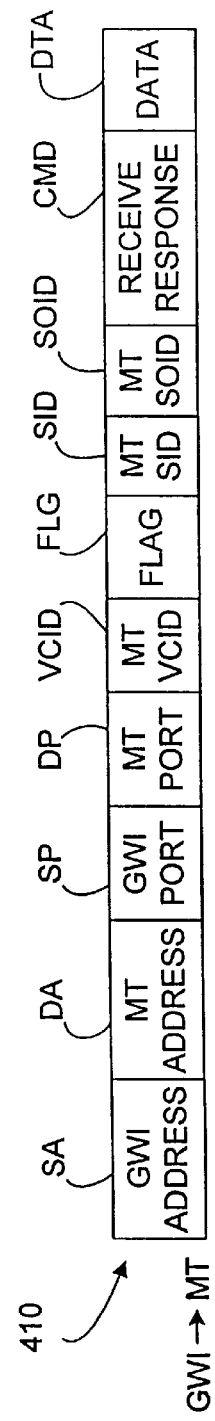
FIG. 10h

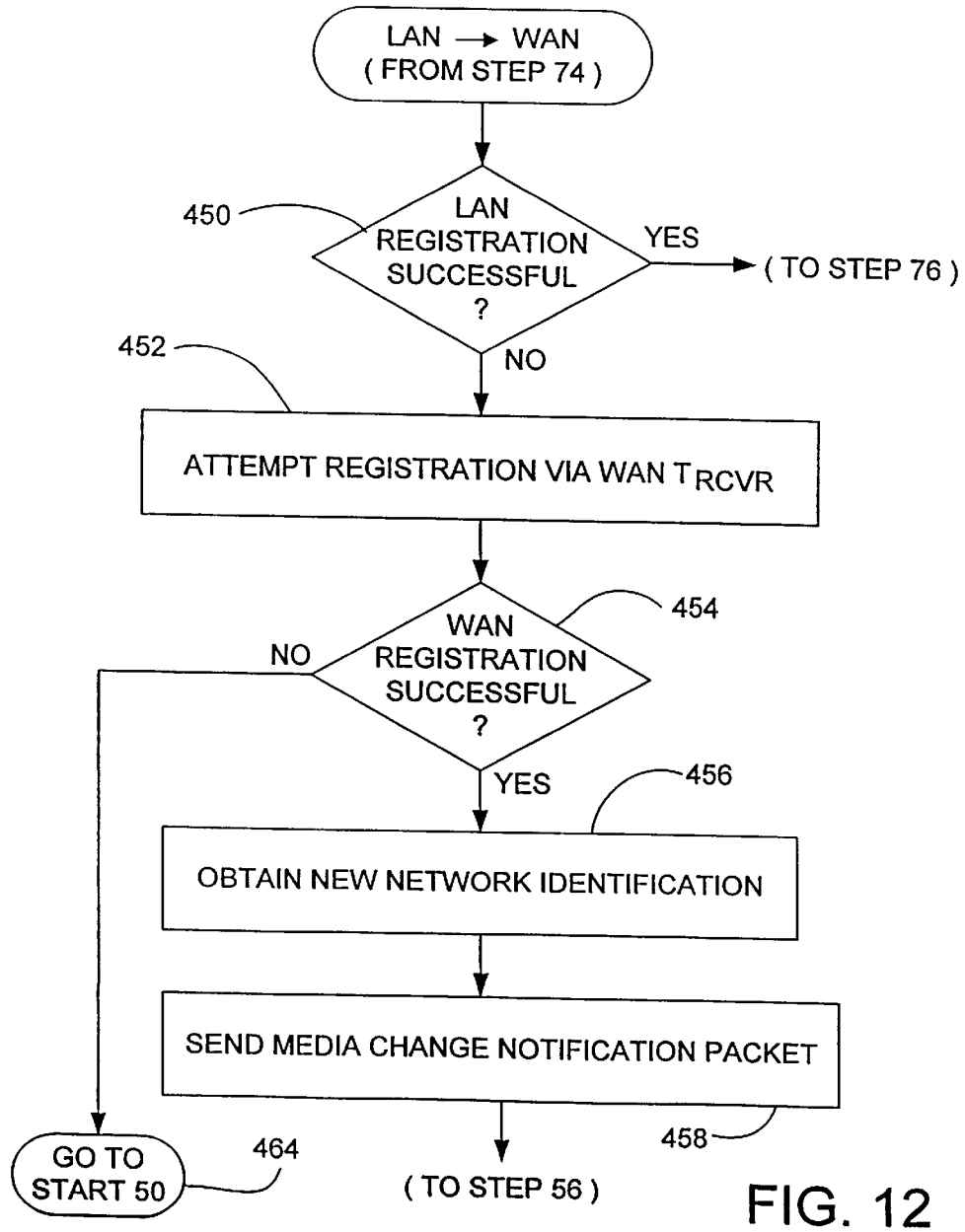

SEAMLESS ROAMING AMONG MULTIPLE NETWORKS INCLUDING SEAMLESS TRANSITIONING BETWEEN MULTIPLE DEVICES

CROSS-REFERENCE TO RELATED APPLICATIONS

This application is a continuation-in-part of co-pending U.S. patent application Ser. No. 08/922,709, entitled "Seamless Roaming Among Multiple Networks", filed on Sep. 3, 1997, which is a continuation-in-part of co-pending U.S. patent application Ser. No. 08/856,122, entitled "Seamless Roaming Among Multiple Networks", filed on May 14, 1997.

TECHNICAL FIELD

The present invention relates generally to wireless mobile communication systems, and more particularly to mobile communication systems involving multiple local area networks (LANs) and wide area networks (WANs).

BACKGROUND OF THE INVENTION

In recent years, the use of wireless mobile communication systems has become increasingly popular. For example, wireless mobile terminals now serve to help automate and expedite processes in retail, manufacturing, warehousing and other industries. In a retail environment, wireless mobile terminals may take the form of a wireless bar code reading device for use in tracking inventory and checking prices. In the warehousing industry, the same mobile terminals may used to keep accurate accounting of incoming and outgoing shipments. In health care, transportation and other industries, the mobile terminals may take the form of wireless pen based computers to aid with on-site document control procedures, etc. In order to provide for real time communication, the mobile terminals often include a radio which allows them to communicate with a host computer connected to a LAN, for example.

LANs typically allow for connecting of devices operating in a building or specified site. Devices physically connected to the LAN may include desk top computers, printers and host computers. If the LAN also supports wireless mobile terminals such as those mentioned above, the LAN will also have connected thereto one or more access points (sometimes referred to as base stations). Each access point is coupled to the LAN and includes at least one radio through which wireless communication with the mobile terminals can occur.

Each access point can communicate with mobile terminals operating within the cell coverage area of the access point. The cell coverage area is the area in which the access point can reliably communicate with a mobile terminal. Once the mobile terminal roams outside of the cell coverage area of the access point, the mobile terminal can no longer communicate with the LAN through that particular access point. In order to provide cell coverage throughout an entire building or site, a LAN typically includes multiple access points strategically located throughout the building or site. Thus, the combined cell coverage of the access points is sufficient to cover the entire building or site. Mobile terminals may then roam from one area to another within the LAN.

As a mobile terminal roams throughout a LAN, it is important that an end to end session established between the mobile terminal and a device coupled to the backbone be maintained as the mobile terminals move from one cell to another cell. Known techniques for providing such seamless roaming from one access point to another access point within a given LAN are described in U.S. Pat. No. 5,276,680, for example.

However, recent trends have shown a desirability for mobile terminals to be able to roam not only within a given LAN, but also among different LANs and/or wide area networks (WANs). Although there are known techniques for allowing mobile terminals to roam seamlessly from one access point to another within a given LAN, this does not include the ability for mobile terminals to roam seamlessly from LAN to LAN, or LAN to WAN, for example. According to current technology, when a mobile terminal wishes to roam from one LAN to another the mobile terminal typically must disassociate itself from one LAN and reassociate itself with another LAN. This break in communication makes it difficult for information originating from the former LAN to be forwarded to the mobile terminal in the new LAN. Such difficulty adds overhead such as time and complexity associated with establishing a new connection.

Further, situations can arise where it is desirable to transition a session from one mobile terminal to another mobile terminal without loss of a connection and/or the overhead associated with terminating a session with the one mobile terminal and restarting a session with the other mobile terminal. For example, a user may be conducting communications between a mobile terminal and a host computer collecting inventory data or the like. In the event the user is inexperienced, the user may encounter a difficulty and desire assistance from his or her superior. The superior would then have to study the situation using the same mobile terminal, thus necessitating that the superior meet in person with the user. Alternatively, the user must close out the session between the mobile terminal and host computer and the supervisor must attempt to reestablish a new connection with his or her own mobile terminal and duplicate the circumstances which created the difficulty. This can be difficult and costly in operational down time and/or employee costs in situations where the user and supervisor are located a considerable distance apart, for example.

Alternatively, a situation may arise where a mobile terminal is permanently fixed to a vehicle such as a forklift used in a warehouse. Circumstances may be such where a user may desire to access a portion of the warehouse which is inaccessible using the forklift (e.g., uppermost shelving in the warehouse). In the past, a user would have to close a session involving the mobile terminal fixed to the forklift and open a new session using a portable mobile terminal.

As another example, one type of mobile terminal may be suited for operation in one particular type of environment (e.g., indoors at moderate temperatures) whereas another type of mobile terminal may be suited only for operation at sub-zero temperatures. A user taking inventory at a warehouse including both room temperature stock areas and freezer areas would have to close a session and open a new session when transitioning from one area to another. Obviously such opening and closing of sessions can be time consuming and frustrating.

In view of the aforementioned shortcomings with conventional techniques, it will be appreciated that there is a strong need in the art for a wireless mobile communication system which provides for seamless transitioning between devices such as mobile terminals in addition to seamless roaming among different networks.

SUMMARY OF THE INVENTION

The communication system of the present invention introduces a gateway controller (hereinafter referred to simply as a "gateway") connected to at least one network such as a LAN or WAN. Each gateway functions as an intermediary for communications between mobile terminals registered to an access point within a network or otherwise coupled to the network and one or more other devices. By serving as an intermediary, the actual network addresses of the mobile terminals become transparent to the devices with which the mobile terminals are communicating. As a result, even if a mobile terminal roams from one LAN to another LAN and receives a new network address, communication between the mobile terminal and the other devices are not interrupted so as to provide for seamless roaming.

Similarly, since the actual network addresses of the mobile terminals become transparent to other devices it is possible to provides a seamless transition between communications involving a first mobile terminal and a device, and communications involving a second mobile terminal and the device. In an exemplary embodiment, a first mobile terminal may suspend a previously established session between the first mobile terminal and a device. The first mobile terminal notifies the gateway through which the session is established that the mobile terminal wishes to suspend the session. Rather than terminating the session, the gateway is configured to maintain the session in its tables and to begin buffering in memory any information received via the network intended for the first mobile terminal. In the event a second mobile terminal wishes to resume the session at a point at which the first mobile terminal suspended the session, the second mobile terminal establishes a connection with the gateway. The second mobile terminal then notifies the gateway that it wishes to resume the session suspended by the first mobile terminal. The gateway is configured to begin in turn to forward communications between the device and the second mobile terminal in place of the first mobile terminal.

Any information which has been buffered by the gateway is sent to the second mobile terminal together with state information regarding the state of the connection between the first mobile terminal and the gateway at the time of the suspension. As a result, the second mobile terminal can pick up where the first mobile terminal left off without completely terminating an initial session and restarting a new session. This results in a substantial savings in both time and effort regardless of the particular application.

According to one aspect of the invention, a communication system is provided which includes a network backbone; a gateway controller, operatively coupled to the network backbone, for serving as an intermediary for communications between mobile terminals and devices coupled to the network backbone through respective communication sessions; a first mobile terminal operative to establish a communication session with a device coupled to the network backbone through the gateway controller, the first mobile terminal being configured to request selectively that the gateway controller suspend the communication session, and the gateway controller being configured to carry out such request; and the gateway controller being further configured to accept a request from a second mobile terminal and to cause the suspended communication session to be resumed between the device and the second mobile terminal without requiring that the communication session be terminated from the perspective of the device.

According to another aspect of the invention, a method is provided for carrying out communications within a system including a network backbone; and a gateway controller, operatively coupled to the network backbone, for serving as an intermediary for communications between mobile terminals and devices coupled to the network backbone through respective communication sessions. The method includes the steps of: a first mobile terminal establishing a communication session with a device coupled to the network backbone through the gateway controller, the first mobile terminal requesting that the gateway controller suspend the communication session, and the gateway controller carrying out such request; and the gateway controller accepting a request from second mobile terminal to cause the suspended communication session to be resumed between the device and the second mobile terminal without requiring that the communication session be terminated from the perspective of the device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 4a–4j are schematic illustrations representing an exchange of packets for establishing a virtual circuit, session and socket connection between a mobile terminal and another device on the network in accordance with the present invention;

FIG. 5a represents a virtual circuit table maintained in memory by each mobile terminal for keeping track of the various virtual circuits which have been established through a gateway with different devices in accordance with the present invention;

FIG. 5b represents a corresponding virtual circuit table maintained in memory by each gateway for keeping track of the various virtual circuits which have been established through the gateway between various mobile terminals and devices in accordance with the present invention;

FIGS. 10a–10j are schematic illustrations representing an exchange of packets a between a mobile terminal, gateway and other device for establishing a reverse direction link in accordance with the present invention;

FIG. 11 represents a table maintained by a domain name server in accordance with the present invention;

FIG. 12 is a flowchart describing a routine for accomplishing seamless roaming between a LAN and a WAN in accordance with the present invention;

DESCRIPTION OF THE PREFERRED EMBODIMENTS

Figure 1:
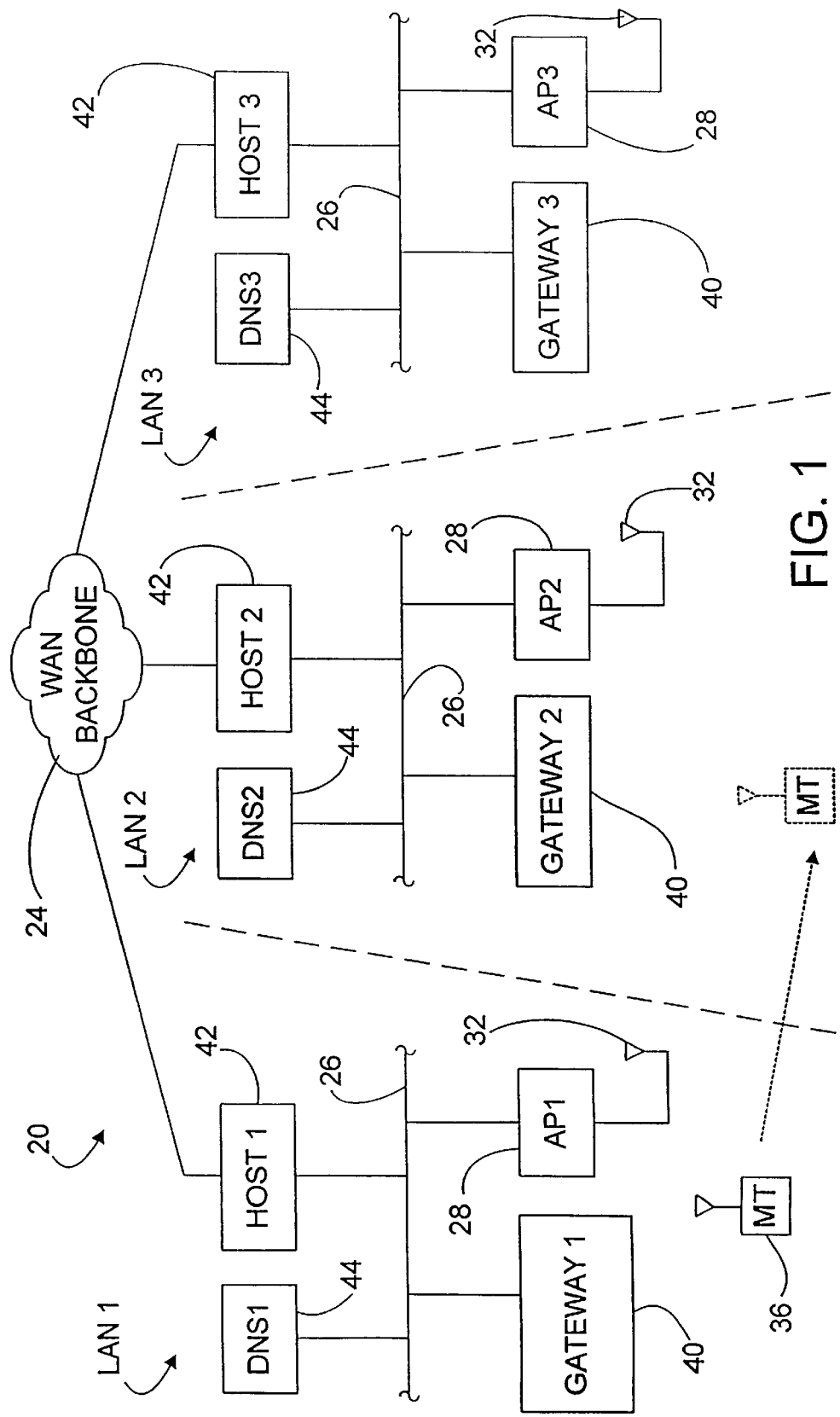
FIG. 1 is a block diagram of a wireless mobile communication system in accordance with the present invention.

The present invention will now be described with reference to the drawings wherein like reference numerals are used to refer to like elements throughout.

As is mentioned above, the present invention relates to wireless communication systems which include mobile terminals that can roam from cell to cell and from LAN to LAN. Such mobile terminals can be data terminals, telephones, pagers, etc. In the exemplary embodiment described hereinafter, each mobile device is a mobile data terminal (hereinafter "mobile terminal") used to communicate data such as inventory or the like within a communications system such as a cellular communication system. However, it is recognized that the invention contemplates other types of mobile terminals and is not intended to be limited to systems utilizing mobile data terminals. Other types of mobile terminals may be referred to in the industry as a mobile end system, mobile node, or mobile client, for example.

Referring now to FIG. 1, a communication system 20 is shown in accordance with the exemplary embodiment of the present invention. The communication system 20 includes a plurality of LANs (e.g., LAN1–LAN3) each coupled together via a network backbone 26. Each LAN1–LAN3 itself forms a communication network. The LANs are interconnected according to generally known network principles by way of a system backbone 24, and specifically in the present embodiment by a WAN system backbone 24. It shall be appreciated, however, that the system backbone 24 need riot be wireless in nature but rather hardwired such as those achieved by connecting to an intranet or internet, for example, which could also serve as the system backbone 24.

Each of the LANs (LAN1–LAN3) have generally the same configuration, hence only LAN1 will be described in detail. However, it will be appreciated that there may be variations in the respective LANs without departing from the scope of the invention. Referring initially to LAN1, the local area network comprise its own network backbone 26.

The network backbone 26 may be a hardwired data communication path made of twisted pair cable, shielded coaxial cable or fiber optic cable, for example, or may be wireless in nature. Connected to the network backbone 26 are several access points 28, only one of which is shown (namely, access point AP1) for sake of illustration. Each access point 28 serves as a point through which wireless communications may occur with the network backbone 26. Additionally, in order to expand the effective communication range of the access points 28, one or more wireless access points (not shown) also may be included in LAN1.

Each access point 28 is capable of wirelessly communicating with other devices within its cell coverage via an antenna 32. As is known, depending on the type of antenna 32 selected and the output power of the respective access point 28 the cell coverage of the access point 28 may take any of several different forms and sizes. For example, FIG. 1 depicts the access point 28 as utilizing an omni-directional antenna 32 wherein a generally spherical cell area of coverage is obtained. However, a directed yagi-type antenna or other form of antenna could also be used as will be readily appreciated.

The LAN1 also includes one or more mobile terminals 36. For sake of example, only one mobile terminal 36 is shown although it will be appreciated that each LAN is likely to have several mobile terminals 36 associated therewith. Each mobile terminal 36 communicates with devices on the network backbone 26 of the LAN in which it is registered or, as described below, is capable of communicating with devices on the network backbone 26 of other LANs within the WAN. Within a given LAN (e.g., LAN1), the mobile terminal 36 may roam from one cell to another as covered by different access points 28. While roaming within a given LAN, the mobile terminal 36 is configured to associate itself with a new access point 28 in each new cell area according to conventional techniques. The mobile terminal 36 communicates with the network backbone via wireless communications through the access point 28.

According to the present invention, however, mobile terminals 36 also seamlessly roam from one network to another network without a need to terminate and reestablish an end to end session between the mobile terminal 36 and a device coupled to one of the networks. For example, FIG. 1 illustrates in phantom the manner in which a mobile terminal 36 roams from LAN1 to LAN2. Specifically, the mobile terminal 36 originally is registered to an access point 28 (AP1) in LAN1. The mobile terminal 36 originally has a network identification or address which has been assigned to it by virtue of being registered within LAN1. However, when the mobile terminal 36 moves outside of the cell coverage of access point AP1 and into the cell coverage of an access point 28 (AP2) included in LAN2, the mobile terminal 36 newly registers with the access point AP2. As a result, the mobile terminal 36 receives a new network identification or address by virtue of becoming registered within LAN2.

Since the devices which the mobile terminal 36 had been communicating with in LAN1 would not know the new address assigned to the mobile terminal 36 upon moving to LAN2, the present invention provides a means for compensating for such lack of knowledge. Specifically, in the present embodiment each LAN also includes a gateway 40 which serves as an intermediary for communications between the immobile terminal 36 and other devices within the system 20. However, it will be appreciated that only one gateway 40 need be connected to one of the network backbones 26 to carry out the present invention. Mobile terminals registered with access points 28 on a network backbone 26 other than the network backbone 26 the gateway 40 is connected to would communicate with the gateway 40 via the system backbone 24 discussed above. As is described more fully below, for each mobile terminal 36, a virtual circuit is established between itself and the gateways 40. Although the network address of the mobile terminal 36 may change as a result of the mobile terminal 36 roaming from one LAN to another LAN, the relevant parameters of the corresponding virtual circuit remain the same. Hence, communications between the mobile terminal 36 and a given device are properly routed notwithstanding the change in the network address of the mobile terminal 36. In fact, in the preferred embodiment the devices with which the mobile terminal 36 is communicating remain unaware that the mobile terminal 36 has received a new network address. The manner in which such seamless roaming is carried out is described in more detail below in relation to FIGS. 2–5.

Also connected to the network backbone 26 of each LAN is a host computer 42 and a domain name server 44 or other name resolver. The host computer 42 performs conventional host functions within the respective LAN. In addition, the host computer 42 serves as an interface connection to the system backbone 24 in a conventional manner. Of course, the gateway 40 or any other LAN device could alternatively serve as an interface connection to the system backbone 24. The domain name server 44 or other name resolver in each LAN performs the conventional function of providing name to network address mapping for devices within each LAN. Furthermore, each LAN may include one or more other devices connected to the network backbone 26. Although not shown, such devices may include work terminals, printers, cash registers, etc.

Figure 2:
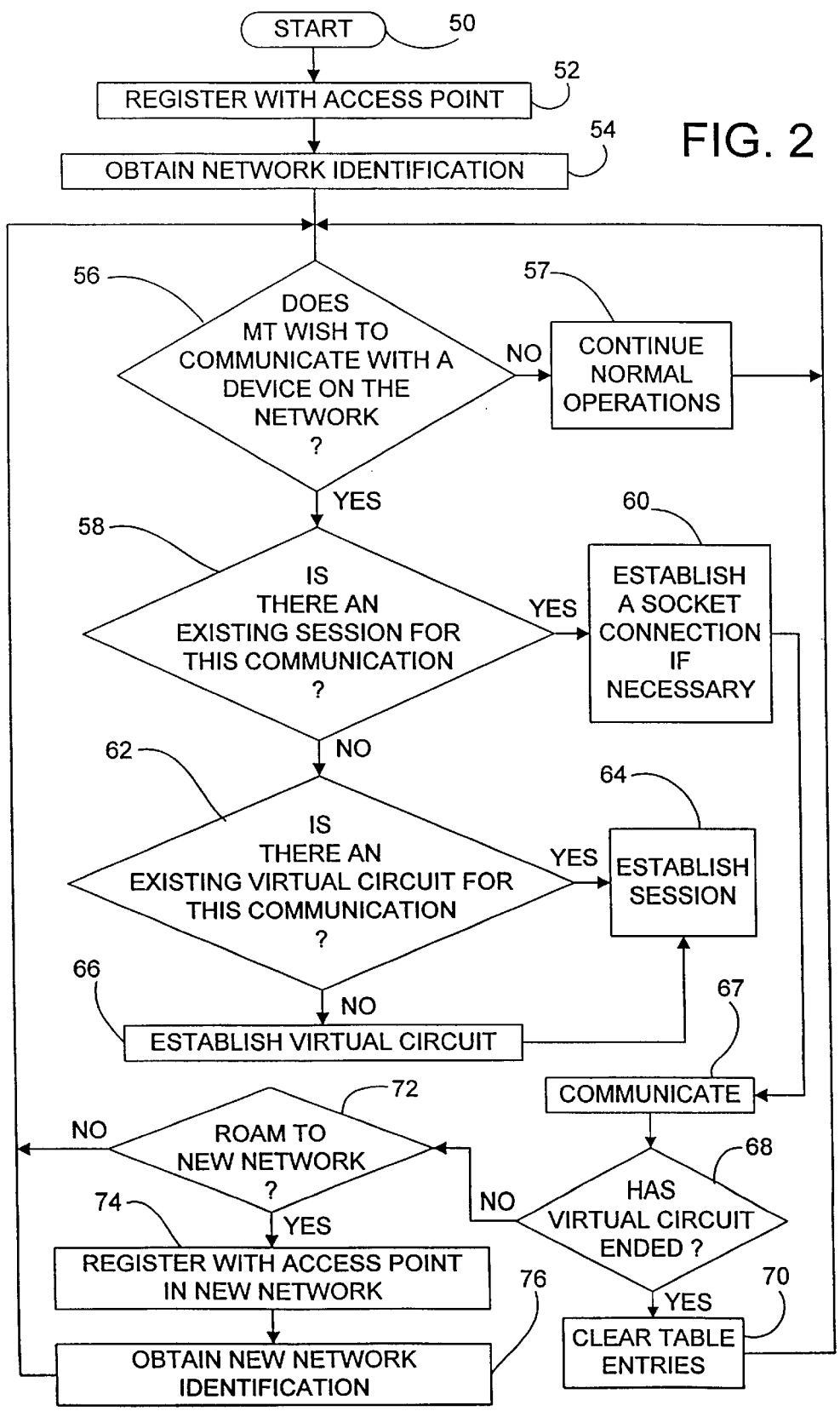
FIG. 2 is a flowchart describing, in relevant part, the general operation of the mobile communication system in accordance with one aspect of the present invention.

Turning now to FIG. 2, the basic operating protocol for a mobile terminal 36 roaming between LANs is shown in accordance with the invention. For sake of example, it is assumed that the mobile terminal 36 initially powers up and registers within the cell area of an access point 28 (AP1) belonging to LAN1. Thereafter, the mobile terminal 36 will move to LAN2 as represented in FIG. 1 and register with access point AP2 in LAN2. It will be appreciated, however, that the same principles are applied when roaming between any two LANs.

Referring initially to step 50, the mobile terminal 36 is powered up and/or reset within the cell coverage of access point AP1. Next, in step 52 the mobile terminal 36 registers with the access point AP1 using any of several known conventional techniques, for example. By registering, the access point AP1 assumes responsibility for receiving wireless communications from the mobile terminal 36 and forwarding the communications onto the network backbone 26. Similarly, the access point AP1 assumes responsibility for receiving communications on the network backbone 26 which are destined for the mobile terminal 36. The access point AP1 then forwards such communications wirelessly to the mobile terminal 36.

Next, in step 54 the mobile terminal 36 obtains a network identification (ID)/address. Such network ID may be obtained via any of several known conventional techniques in which a unique network ID is assigned to each particular mobile terminal 36 within the LAN1. In some instances, the network ID and/or port ID may be statically preconfigured within the mobile terminal 36. In the exemplary embodiment, the mobile terminal 36 in step 54 obtains a network ID which includes a network address and port in accordance with conventional network protocol(s). The mobile terminal 36 also obtains the gateway 40 network ID and port ID in a similar fashion. Alternatively, the mobile terminal 36 may first obtain a link layer ID in accordance with the technique described in commonly assigned, co-pending U.S. patent application Ser. No. 08/778,405, filed Jan. 2, 1997 and entitled "Mobile Device ID Allocation System and Method" which in turn could be used to obtain a network ID. The disclosure of the '405 application is incorporated herein by reference.

Following step 54, the mobile terminal 36 in step 56 determines if any application program running on the mobile terminal 36 is currently attempting to communicate information to a device on the network backbone 26. If the mobile terminal 36 determines that no information currently needs to be transmitted, the mobile terminal goes to step 57 where it continues all of its other normal operations and returns again to step 56. If, however, the mobile terminal 36 does wish to communicate information to a device on the network, the mobile terminal 36 proceeds to step 58.

In step 58, the mobile terminal 36 determines if there is an existing session for the mobile terminal 36 to transmit the information it desires. As discussed in more detail below, the mobile terminal 36 may have already established a session with GATEWAY1 to communicate information to other devices throughout the communication system 20. If the mobile terminal 36 determines that a session is established for this information it desires to transmit then the mobile terminal 36 continues to step 60. If not, the mobile terminal 36 continues to step 62 where the mobile terminal determines if a virtual circuit has been established for transmitting the information.

Prior to being able to transmit the information to a device on the network, the mobile terminal 36 must, in step 60, determine if a socket end point is established (via GATEWAY1) to the device the mobile terminal 36 desires to communicate. Socket end points are frequently established and ended between a mobile terminal 36 and a device on the network and it may even be the case that more than one socket end point is established between a given mobile terminal 36 and a given device to accommodate the transfer of data between application programs running on each. Thus, in step 60, if a socket end point which is able to handle the transfer of current information from the mobile terminal 36 to the device is not established, the mobile terminal establishes such a socket end point. The socket end point is established based on an exchange of a series of packets between the mobile terminal 36 and GATEWAY1. This process is described below in connection with FIGS. 4g–4j. Once the socket is established, communications between the mobile terminal 36 and the device occur in step 67. The communications occur via GATEWAY1 serving as an intermediary. An example of such communication is described below in association with FIGS. 4k–4n. It is noted that in this example, the mobile terminal 36 initiated a connection oriented socket end point with the device it desired to communicate, however, connectionless oriented socket end point associations could also be established using conventionally known protocols such as UDP.

If in step 58, the mobile terminal 36 determines that there is not an existing session to transfer the current information to the device the mobile terminal 36 will have to establish such a session. However, prior to establishing such a session, the mobile terminal 36 in step 62 determines if a virtual circuit exists between a mobile terminal 36 and one or more other devices within the communication system 20. As will be described below, each virtual circuit in the preferred embodiment can include up to a predefined number of sessions. Each session, in turn, consists of up to a predefined number of sockets. The predefined number of sessions and sockets available are each typically of a very large magnitude (i.e. $2^{16}$) and therefore are often considered unlimited. If a virtual circuit already exists for transferring the current information as determined in step 62, the mobile terminal 36 goes to step 64 where it will establish a session within this virtual circuit prior to transferring the information to the device. If a virtual circuit does not exist, the mobile terminal 36 will have to first establish the virtual circuit before establishing the session as discussed below with respect to step 66.

Turning to step 64, a session is established in accordance with the present invention by exchanging a series of information packets between the mobile terminal 36 and GATEWAY1 as discussed below in relation to FIGS. 4c–4d and 5a–5b. If necessary address information for the particular device with which the mobile terminal wishes to communicate may be obtained using well known name resolution techniques. For example, the mobile terminal 36 may want to communicate with the host computer 42 (HOST1) in LAN1. As discussed below in connection with FIGS. 4e–4f, the mobile terminal 36 and GATEWAY1 exchange a series of packets which results in GATEWAY1 providing the mobile terminal 36 with the network address of the host computer HOST1. Once the session is established and the address of the particular device is determined, the mobile terminal continues to step 60 where a socket end is established.

If in step 62, the mobile terminal 36 determines that no virtual circuit exists for transferring the present information to the device, or if the mobile terminal 36 simply wishes to establish a new virtual circuit, the mobile terminal 36 goes to step 66. In step 66, a virtual circuit between the mobile terminal 36 and GATEWAY1 is established. As described below with respect to FIGS. 4a–4b and 5a–5b, the mobile terminal and GATEWAY1 exchange a series of information packets which establishes a virtual circuit entry in corresponding tables stored therein. The virtual circuit is used to identify a particular communication connection between the mobile terminal 36 and GATEWAY1 through which connections may be established with devices which the mobile terminal 36 wishes to communicate. Following the establishment of a virtual circuit in step 66, the mobile terminal continues to steps 64 and 60 where a session and socket are next established, respectively, within the virtual circuit.

Once a virtual circuit, session, and socket end point is established and the information is transmitted in step 67, the mobile terminal goes to step 68 to determine if any virtual circuits are to be terminated.

For example, the mobile terminal 36 may conclude that it no longer needs to communicate with the host computer HOST1 and wishes to terminate the connection. Alternatively, there may be a predefined time limit placed on the duration of each virtual circuit and thus all corresponding sessions. Accordingly, the GATEWAY1 may be responsible for serving as a timekeeper and determining when a virtual circuit is to terminate. The GATEWAY1 in such instance is responsible for informing the mobile terminal 36 that the virtual circuit is about to be terminated. If a virtual circuit is to end as determined in step 68, the system proceeds to step 70 in which the corresponding session and socket connection entries in the tables of the mobile terminal 36 and the GATEWAY1 are cleared as will be better understood in view of the discussion of FIGS. 5a–5b below.

If in step 68 the virtual circuit has not ended, the system proceeds to step 72 in which the mobile terminal 36 determines it has moved to a new LAN (e.g., LAN2). The manner in which the mobile terminal 36 determines if it has moved to a new LAN can be based on known conventional techniques for determining entry to a new LAN. For example, such determination can be based on the known mobile internet protocol defined in Internet Engineering Task Force (IETF) Spec. R.F.C. 2002. Generally speaking, the mobile terminal 36 upon roaming from LAN1 to LAN2 will proceed beyond the cell coverage of AP1 in LAN1 and will not be able to register with any other access points 28 within LAN1. Hence, the mobile terminal 36 will conclude that it has roamed from the previous LAN (LAN1) to a new LAN (e.g., LAN2) with which it must newly register. It is noted that the steps of determining if a virtual circuit has ended (step 68) and the step of determining if the mobile terminal 36 roamed to a new LAN (step 72) may occur at any instant throughout the process described in FIG. 2 and is only shown at their current locations for discussion purposes only.

If the mobile terminal 36 concludes it has roamed to a new LAN, the mobile terminal 36 proceeds to step 74 in which it registers with an access point 28 (e.g., AP2) in the new LAN (e.g., LAN2) in the same manner as was done in step 52. Assuming the mobile terminal 36 has roamed within the cell coverage of the access point AP2, the mobile terminal 36 will thus be able to register with the access point AP2. Next, in step 76 the mobile terminal 36 obtains a new network ID pertaining to the new LAN2. Step 76 is similar to step 54 described above in that the mobile terminal 36 uses conventional techniques to obtain a unique network ID within its local network LAN2. There may or may not be communication between the different LANs 1–3 regarding the particular network IDs assigned to the mobile terminals 36 and the network IDs of the mobile terminals 36 are not fixed in the preferred embodiment. Thus, the new network ID of the mobile terminal 36 in step 76 may be different from the network ID assigned in step 54 in virtually every case.

Nevertheless, the virtual circuit, session, and socket connection information previously obtained via the GATEWAY1 is still valid despite the mobile terminal 36 receiving a new network address in step 76. Thus, packets delivered to the GATEWAY1 for routing to the mobile terminal 36 still may be routed to the mobile terminal 36 by the GATEWAY1 as discussed below in connection with FIG. 4o. Accordingly, the system returns to step 66 in which communications can be continued to be carried out seamlessly. If, on the other hand, the mobile terminal 36 does not roam to a new LAN as determined in step 72, the system returns directly to step 56. It is noted that under certain circumstances it may be the case that the mobile terminal 36 ends its session with a host computer or other device without the device knowing the session has ended and therefore communication destined for the mobile terminal 36 in such cases would not be forwarded on the GATEWAY1.

Figure 3:
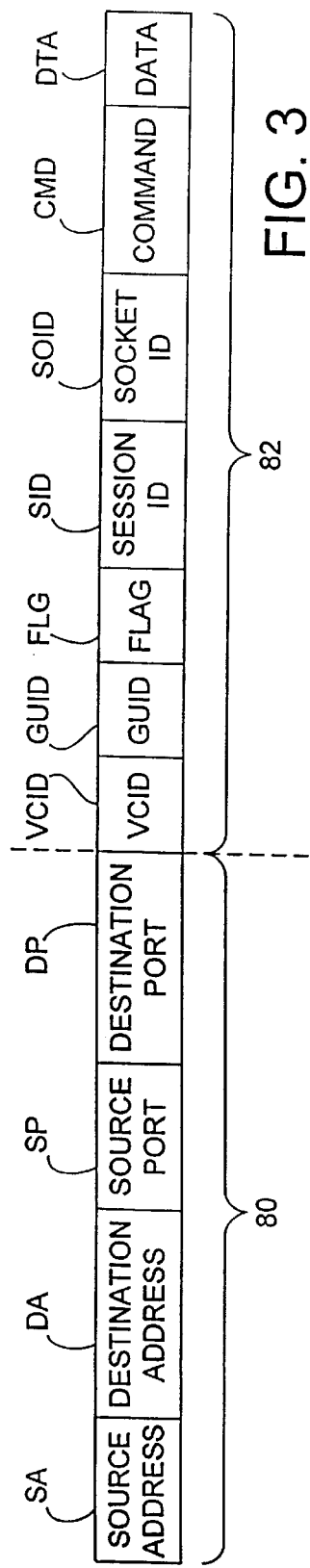
FIG. 3 is a schematic diagram showing a general format of an information packet in accordance with the present invention.

Turning now to FIG. 3, a standard packet format for information communicated in the system 20 is shown. The packet format shown in FIG. 3 includes a number of different fields, some or all of which may be present in a given packet at a given time. The packet consists primarily of a header portion 80 and a payload portion 82. The header portion 80 is included in all communications in the respective LANs. The payload portion 82 ordinarily is reserved for data being transferred between two or more devices communicating in a given LAN. According to the present invention, however, the payload portion 82 also is used to communicate information regarding the particular virtual circuit, session, socket, etc. As will be appreciated, this allows the present invention to be carried out in a manner which is transparent to most devices on the network with the exception of the gateway 40 and mobile terminals 36. Thus, the present invention can be incorporated into existing systems with only minor modifications.

As shown in FIG. 3, each packet includes a source address (SA) field which identifies the network address of the device transmitting the packet. In addition, each packet includes a destination address (DA) field which identifies the network address of the device to which the packet is being transmitted. Next, the packet includes a source port (SP) field and destination port (DP) field which identify the ports of the devices transmitting and receiving the packet, respectively. Within the payload portion 80, the packet may include a globally unique identification (GUID) field used for uniquely identifying a GUID associated with the mobile terminal 36 transmitting the packet. A virtual circuit identification (VCID) field is used for identifying a particular virtual circuit associated with the packet transmission. A flag (FLG) field is used to indicate a change in the network identification of the mobile terminal 36 as will be described below. Similarly, a session identification (SID) field and socket identification (SOID) field are used for identifying the particular session and socket, respectively, associated with the packet transmission as will be explained below.

A command (CMD) field is included in the packet for identifying particular functions to be carried out as will be described by way of example below. A data (DTA) field is used for containing data which is to be transmitted in accordance with the invention.

According to conventional communication network routing protocol, information packets ultimately are routed to the destination address and destination port identified in the DA and DP fields, respectively. With regard to packets which are transmitted from the mobile terminal 36, each access point 28 is configured to recognize a packet which is being transmitted from a mobile terminal 36 which is registered thereto. The access point 28 in turn receives the packet via its antenna 32 and retransmits its contents onto the network backbone 26 according to known convention. As far as packets which are destined for the mobile terminal 36, the access point 28 receives such a packet off the network backbone 26 and retransmits the information to the mobile terminal 36 via its antenna 32 according to known convention.

With the exception of the mobile terminals 36, the locations of all fixed devices on the respective LANs 1–3 and WAN 22 are essentially known based on conventional network routing protocol. In other words, provided a current network identification is known for a device, a packet will be delivered to the device via appropriate routers, etc. Thus, for example, the access point AP2 in LAN2 can transmit a packet to GATEWAY1 in LAN1 via the WAN backbone 24 according to conventional techniques. Hence, details regarding the communications between the fixed devices on the respective LANs will not be described in detail for sake of brevity.

Figure 4A:
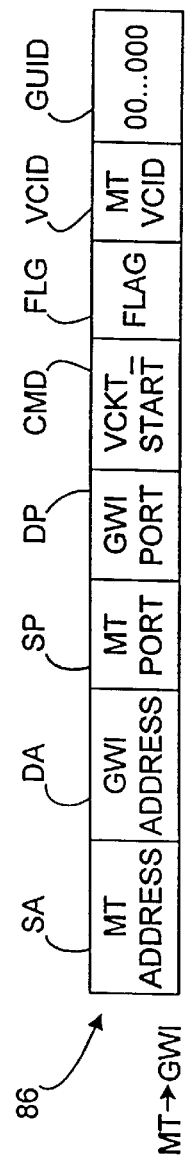
Figure 4B:
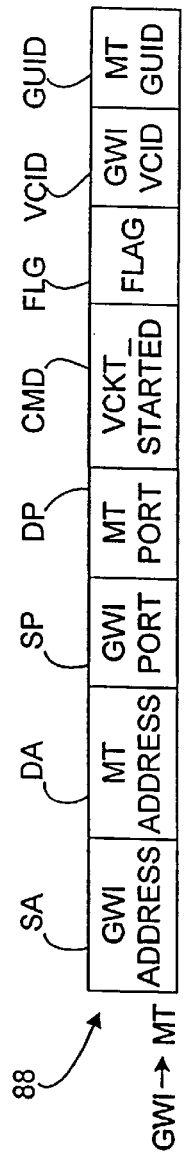

Referring now to FIGS. 4a–4b, the manner in which a virtual circuit is established (FIG. 2, step 66) will be described. In the present example, the mobile terminal 36 initially registers to the access point AP1 in LAN1 as shown in FIG. 1. Next, as shown in FIG. 4a, the newly registered mobile terminal 36 generates and wirelessly transmits a packet 86 to the local gateway 40 (GATEWAY1). Using conventional techniques, the mobile terminal 36 retrieves its network ID and that of the gateway's 40 if such IDs are not already statically programmed into the mobile terminal 36. The SA field and SP field in packet 86 include the network address and port of the mobile terminal 36, respectively. The DA field and DP field include the network address and port of the GATEWAY1, respectively. The network address and port of the GATEWAY1 may be previously obtained by the mobile terminal 36 in a number of different manners. For example, each access point 28 may be programmed to provide the address and port for the default gateway 40 whenever a mobile terminal 36 newly registers. Alternatively, the network address and port for a gateway 40 may be statically configured within the mobile terminal 36.

The GUID field in the packet 86 is set to all zeros or some other predefined value to indicate that a GUID has not yet been assigned to the mobile terminal 36. Of course, in an alternative embodiment, the GUID may have been previously retrieved or preassigned by the mobile terminal 36. As is described below in relation to FIG. 4b, this prompts the GATEWAY1 to perform a function call to the LAN1 operating system requesting a GUID for the mobile terminal 36.

Referring briefly to FIG. 5a, shown is a virtual circuit table which is maintained in memory by the mobile terminal 36 for purposes of keeping track of the various virtual circuit connections. In the exemplary embodiment, the table consists of N rows with each row representing a possible virtual circuit (i.e., VC1 through VCN). N can be any preselected integer which represents the number of virtual circuits the mobile terminal 36 may have established at any given time.

For each virtual circuit there is also a corresponding gateway 40 identification associated therewith (not shown) given that a mobile terminal could begin communicating via two or more gateways at any given time.

As shown in FIG. 5a, each virtual circuit entry (VC1 through VCN) has associated therewith L possible sessions (i.e., Session1 through SessionL). L can be any preselected integer which represents the number of sessions in which the mobile terminal 36 can participate at any given time. Each session entry in the table has associated therewith a preselected number of possible sockets for representing socket end points in a given session. In the exemplary embodiment, each session includes two sockets (Socket1, Socket2), although a different number is possible. For each socket end point there is associated a device (i.e., HOST1) with which the mobile terminal 36 may communicate. As there may be many application programs running on the mobile terminal, there may also be several socket end points for the same device.

The mobile terminal virtual circuit table is empty initially and void of any valid columns or rows. As the mobile terminal 36 establishes new virtual circuits, sessions and sockets to establish communication links, entries to the table are inserted with corresponding information from the gateway 40 to indicate which virtual circuits, sessions and sockets are utilized. Thus, the virtual circuit table can dynamically grow in size.

When a particular virtual circuit, session and/or socket is not in use and/or is terminated, the mobile terminal 36 invalidates or deletes the corresponding entries in the virtual circuit table thereby possibly reducing it in size. Thus, the mobile terminal 36 may always look to the virtual circuit table to see which circuits, sessions and sockets are available and which are in use. It is noted that virtual circuit table could be configured to accept only a limited number of entries or that the virtual circuit table could be static in nature in alternative embodiments.

Turning briefly to FIG. 5b, a corresponding virtual circuit table which is stored in memory in each gateway 40 is shown. The table is structured in the same manner as the virtual circuit table described in FIG. 5a and may be static or dynamic in nature. The number of virtual circuits will typically be larger than those found in the mobile terminal 36. This is because each gateway 40 will likely be handling traffic for multiple mobile terminals 36. The number of sessions per virtual circuit and sockets per session preferably is the same as that for the mobile terminal 36. Hence, a given virtual circuit connection between the gateway 40 and the mobile terminal can provide for L sessions with two or more sockets per session, for example. Also, for each socket the table includes information pertaining to the particular mobile terminal as is discussed below.

Like the mobile terminal 36, the gateway 40 clears any entries which are not in use. Thus, the gateway 40 can look to its virtual circuit table at any time and determine which particular connections are in use and which are available. Although the present embodiment shows all entries related to the virtual circuit, sessions and sockets to be included in a respective single table such as those shown in FIG. 5a and 5b, it will be appreciated that separate tables could be maintained for each and indexed appropriately to provide association.

Referring then back to FIG. 4a, the VCID field in the packet 86 includes the identification of a mobile terminal virtual circuit which the mobile terminal 36 preselects for purposes of establishing a virtual circuit with the GATEWAY1. Specifically, the mobile terminal 36 is configured to look to its virtual circuit table (FIG. 5a) and select a particular virtual circuit (e.g., VC1–VCN) which is presently available. The mobile terminal 36 selects one of the virtual circuits (nominally labeled MT VCID) and includes it the VCID field. This serves to inform the GATEWAY1 of the particular virtual circuit label the mobile terminal 36 is using to represent the connection which is to be established. Finally, the CMD field includes a predefined function call "VCKT_START" intended to inform the GATEWAY1 that the mobile terminal 36 wishes to establish a virtual circuit.

The mobile terminal 36 then transmits the packet 86 wirelessly to the GATEWAY1 via the access point AP1. The GATEWAY1 receives the packet 86 and processes the packet as follows. The GATEWAY1 recognizes the VCKT_START command and looks to its virtual circuit table (FIG. 5b) in order to select a particular virtual circuit (e.g., VC1–VCZ) which is presently available. The GATEWAY1 selects a particular virtual circuit (e.g., VC1) based on what is available (i.e., not in use). The GATEWAY1 then stores in its table in association with the selected virtual circuit entry the MT VCID obtained from the VCID field of the packet 86. Thus, the selected virtual circuit thereby becomes associated with the virtual circuit identified by MT VCID.

Moreover, the GATEWAY1 is configured to detect the presence of all zeros in the GUID field. In response, the GATEWAY1 performs a function call to the operating system of the LAN1 to obtain a GUID for the mobile terminal 36. The manner in which the operating system can provide such GUID is known in the art.

In response to the packet 86, the GATEWAY1 generates a packet 88 as shown in FIG. 4b. The purpose of the packet 88 is to inform the mobile terminal 36 that a virtual circuit has been established and to notify the mobile terminal 36 of the particular virtual circuit label being used to define the connection by the GATEWAY1. In addition, the packet 88 is used to inform the mobile terminal 36 of the particular GUID which is being assigned thereto. Thus, the SA and SP fields of the packet 88 correspond to the address and port of the GATEWAY1, respectively. The DA and DP fields of the packet 88 correspond to the address and port of the mobile terminal 36, respectively, as obtained from the SA and SP fields of packet 86. The GUID field contains the GUID for the mobile terminal 36 (MT GUID) as obtained from the operating system. The VCID field contains the virtual circuit selected by the GATEWAY1 (nominally labeled GW1 VCID). The CMD field contains the predefined command "VCKT$_{13}$ STARTED" to indicate to the mobile terminal 36 that the virtual circuit has been started.

Figure 4C:
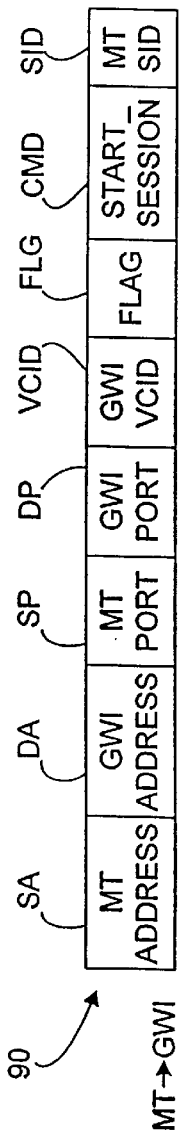

The GATEWAY1 then proceeds to transmit the packet 88 to the mobile terminal 36 via the access point AP1. The mobile terminal 36 receives the packet 88 and processes the packet 88 by storing in memory the MT GUID. In addition, the mobile terminal 36 stores in its virtual table entry for MT VCID the corresponding GW1 VCID as obtained from the VCID field of the packet 88. Next, when the mobile terminal 36 is prepared to start a session (FIG. 2, step 64) the mobile terminal 36 generates a packet 90 to be sent to the GATEWAY1 as represented in FIG. 4c. The header portion of the packet 90 is identical to that of packet 86 (FIG. 4a). The VCID field includes the GW1 VCID assigned to the virtual circuit by the GATEWAY1 (as obtained from the virtual circuit table of the mobile terminal 36). In the SID field the mobile terminal 36 includes the identity of a session which the mobile terminal 36 selects for purposes of establishing the session. Specifically, the mobile terminal 36 again refers to its virtual circuit table (FIG. 5a) and selects a particular session (e.g., Session1) which is available within the previously selected virtual circuit (e.g., VC1). The mobile terminal 36 includes the session (nominally labeled MT SID) in the SID field of the packet 90. Finally, the mobile terminal 36 includes the predefined command "START_SESSION" in the CMD field to notify the GATEWAY1 that the mobile terminal 36 wishes to start a session. The mobile terminal 36 then proceeds to transmit the packet 90 to the GATEWAY1.

The GATEWAY1 receives the packet 90. In response to the command START_SESSION, the GATEWAY1 is configured to again look to its virtual circuit table (FIG. 5b) for the virtual circuit corresponding to the GW1 VCID identified in the VCID field. Specifically, the GATEWAY1 selects a particular session which is available in conjunction with the GW1 VCID previously selected for purposes of generating the packet 88. The GATEWAY1 then proceeds to store in the table entry corresponding to the selected session the session identification (MT SID) selected by the mobile terminal 36 as provided in the SID field of the packet 90.

The GATEWAY1 then proceeds to generate a response packet 92 as shown in FIG. 4d. The purpose of the response packet 92 is to inform the mobile terminal 36 of the particular session label which the GATEWAY1 is assigning to the virtual circuit connection. Hence, the header portion is again standard and is identical to the header portion included in the packet 88. The VCID field includes the MT VCID for the virtual circuit as obtained from the virtual circuit table of the GATEWAY1 corresponding to the entry for GW1 VCID. The SID field includes the particular session (nominally labeled GW1 SID) selected by the GATEWAY1 in response to the packet 90. The CMD field includes a predefined command "SESSION_STARTED" indicating to the mobile terminal 36 that the gateway has selected a corresponding session. The GATEWAY1 then proceeds to transmit the packet 92 to the mobile terminal 36.

The mobile terminal 36 receives the packet 92 and looks to the entry in its virtual circuit table corresponding to the MT VCID identified in the VCID field of the packet 92. The mobile terminal 36 then proceeds to store in its virtual circuit table the GW1 SID obtained from the SID field of the packet 92 in association with the particular session identified in the SID field of the packet 90. Thus, a virtual circuit and session are established between the mobile terminal 36 and the GATEWAY1 based on an exchange of the packets represented in FIGS. 4a–4d. The mobile terminal 36 and the GATEWAY1 each know the corresponding VCID and SID for the other device.

As referred to in step 64 of FIG. 2, the mobile terminal 36 will need to obtain network addressing information for the device on the network with which it desires to communicate in order to establish a socket connection with a particular device on the network. In the present example, it is assumed that the mobile terminal 36 wishes to communicate with the host computer HOST1 in the LAN1. The mobile terminal 36 is configured to first generate a packet 94 as shown in FIG. 4e for the purpose of requesting address information. The packet 94 is to be transmitted to the GATEWAY1 and hence has a header portion similar to that described above in connection with the packet 86. The VCID and SID fields include the GW1 VCID and GW1 SID information, respectively, corresponding to the particular virtual circuit and session the requested address information will relate to. The CMD field includes a predefined command "GET_HOST_BY_NAME" or some other command identifying the particular device with which the mobile terminal 36 wishes to communicate. The DTA field of the packet 94 includes the particular name of the device (e.g., HOST1 NAME).

The packet 94 is transmitted to the GATEWAY1 which is configured to retrieve the device name from the DTA field and query the local name resolver such as DNS 44 for the corresponding network address. Next, the GATEWAY1 generates a response packet 96 as shown in FIG. 4f which is to be transmitted to the mobile terminal 36 with the appropriate header portion. The packet 96 includes the MT VCID and MT SID in the VCID and SID fields, respectively, as obtained from the virtual circuit table of the GATEWAY1, such identifications corresponding to the particular virtual circuit and session identified in the VCID and SID fields of the packet 94. The CMD field includes the predefined command GOT HOST_BY_NAME informing the mobile terminal of the purpose of the packet. The DTA field contains the actual network address(es) of the HOST1 as requested. The packet 96 is transmitted to the mobile terminal 36 which receives the packet and stores the network address.

Step 60 of FIG. 2 relates to establishing the actual socket connection between the mobile terminal 36 and the GATEWAY1. Such procedure begins with the mobile terminal 36 generating a packet 98 to be transmitted to the GATEWAY1 as shown in FIG. 4g. The packet 98 includes a header portion directing the packet to the GATEWAY1. In addition, the packet 98 includes the virtual circuit and session identifiers GW1 VCID and GW1 SID for the GATEWAY1 in the corresponding fields. Again, the mobile terminal 36 is able to obtain such information from the corresponding entries in its virtual circuit table (FIG. 5a). With respect to the SOID field, the mobile terminal 36 now looks to its virtual circuit table and selects an available socket corresponding to the previously selected virtual circuit and session. The mobile terminal 36 selects such a socket (nominally labeled MT SOID) and includes it in the SOID field of the packet 98. The CMD field includes a predefined "START_SOCKET" command informing the GATEWAY1 that it is desired to allocate a socket endpoint.

The packet 98 is transmitted to the GATEWAY1 where it is processed as follows. Specifically, the GATEWAY1 selects an available socket corresponding to the information provided in the VCID and SID fields of the packet 98. The GATEWAY1 then stores in association with the selected socket the MT SOID provided in the SOID field of the packet 98. The GATEWAY1 then generates a response packet 100 to be transmitted to the mobile terminal 36 having the format shown in FIG. 4h. Following the standard header portion, the packet 100 includes the MT VCID and MT SID information in the VCID and SID fields similar to the packet 96. In the SOID field, the GATEWAY1 includes the particular socket (nominally labeled GW1 SOID) which was selected from its virtual circuit table (FIG. 5b) in response to the packet 98. Finally, the CMD field includes a predefined command "SOCKET_STARTED" indicating to the mobile terminal 36 that a socket has been established. The packet 100 is then transmitted to the mobile terminal 36.

The mobile terminal receives the packet 100 and proceeds to store the gateway socket information GW1 SOID in its virtual circuit table in association with the mobile terminal socket identified in the SOID field of the packet 98. Hence, after the exchange of the packets shown in FIGS. 4a–4h, the mobile terminal 36 and the GATEWAY1 have established a unique virtual circuit defined by a VCID, SID and SOID combination. The mobile terminal 36 and the GATEWAY1 each has stored in its virtual circuit table the VCID, SID and SOID combination both from the perspective of the mobile terminal 36 and the GATEWAY 1.

Figure 4I:
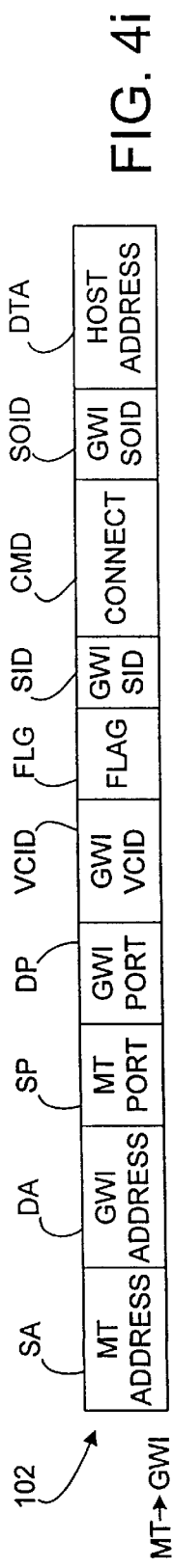

Next, the mobile terminal 36 attempts to begin actual communications (FIG. 2, step 67) with the particular device (e.g., the HOST1). Initially, however, the mobile terminal 36 generates a packet 102 as shown in FIG. 4i. The packet 102 is addressed to the GATEWAY1 and serves the purpose of requesting that the GATEWAY1 obtain a conventional network connection with the HOST1. Specifically, the packet 102 has a standard header portion addressed to the GATEWAY1. The VCID, SID and SOID fields include the virtual circuit, session and socket information from the perspective of the GATEWAY1, i.e., GW1 VCID, GW1 SID and GW1 SOID, respectively. The CMD field includes the predefined CONNECT command notifying the GATEWAY1 of the desire to establish a connection between the gateway and the HOST1. The DTA field includes the actual network address of the HOST1 as obtained from packet 96 discussed above. It is noted that by this time the mobile terminal 36 has stored in the device entry of its virtual circuit table corresponding to the particular socket the identity of the particular device (e.g., the HOST1) and the gateway address and port corresponding to the GATEWAY1. This facilitates the mobile terminal 36 keeping track of such information when establishing virtual circuits with several such gateways 40 and devices in the network.

Figure 4J:
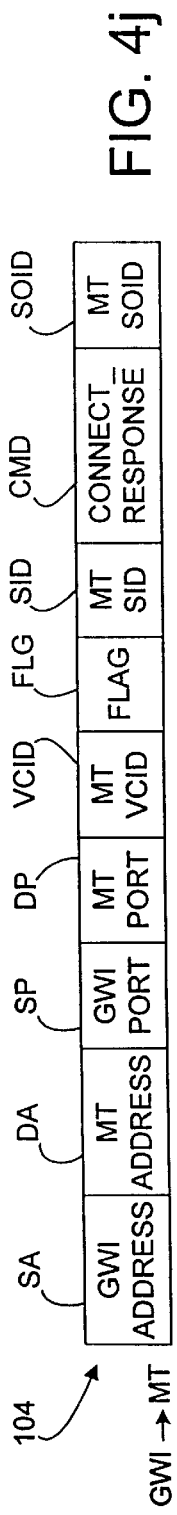

The packet 102 is transmitted to the GATEWAY1 which receives the packet. In response, the GATEWAY1 utilizes conventional network techniques to prepare and/or establish a connection between the GATEWAY1 and the HOST1 as identified in the DTA field of the packet 102. Thereafter, the GATEWAY1 generates a response packet 104 as shown in FIG. 4j. The packet 104 includes the standard header portion in order to be transmitted from the GATEWAY1 to the mobile terminal 36. In addition, the packet 104 includes the corresponding VCID, SID and SOID of the mobile terminal 36 in the appropriate fields. Finally, the CMD field includes a predefined command "CONNECT_RESPONSE" intended to notify the mobile terminal 36 that the connection between the GATEWAY1 and the HOST1 is prepared and/or established.

It is noted that by this time the GATEWAY1 has stored in its mobile terminal entry of its virtual circuit table corresponding to the particular socket, the mobile terminal 36 address, port, and GUID. This facilitates the GATEWAY1 keeping track of which particular mobile terminal 36 is being handled by the respective virtual circuits. In addition, the mobile terminal entry of the virtual circuit table has stored therein the network address of the device (e.g. HOST1) with which the mobile terminal 36 is communicating via the particular virtual circuit connection. Finally, as is discussed below in relation to FIG. 4l, the GATEWAY1 will also store in the mobile terminal entry of the table the particular port being used by the GATEWAY1 for communications with the HOST1 with respect to the specific socket connection.

Figure 4K:
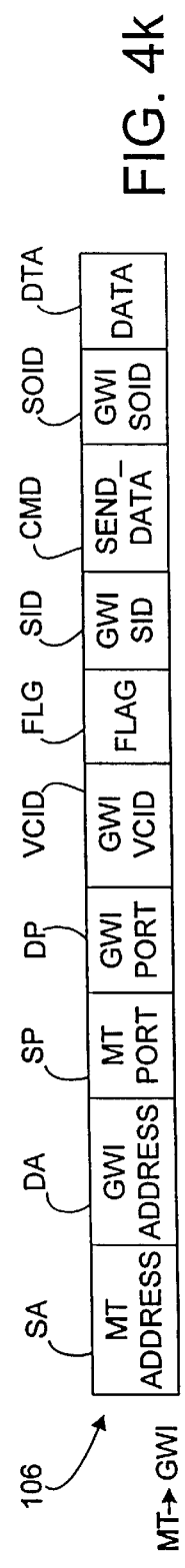
FIGS. 4k–4o are schematic illustrations representing an exchange of data between a mobile terminal and another device before and after the mobile terminal moves from one LAN to another LAN.

The packet 104 is transmitted to the mobile terminal 36 and the mobile terminal 36 is now prepared to communicate with the HOST1 with the GATEWAY1 serving as an intermediary. For instance, FIG. 4k illustrates a packet 106 containing data which the mobile terminal 36 wishes to transmit to the HOST1. Rather than transmitting the data directly to the HOST1, the data stored in packet 106 is directed via the GATEWAY1 using the socket end points previously established for communications between the mobile terminal 36 and the HOST1. Namely, the header portion again includes the address and port of the GATEWAY1 in the DA and DP fields, respectively. The VCID, SID and SOID fields define the complete connection from the perspective of the GATEWAY1 as obtained from the corresponding entries in the virtual circuit table of the mobile terminal 36. The CMD field includes the predefined command "SEND_DATA" informing the GATEWAY1 that the data is to be delivered to the corresponding device (i.e., the HOST1). The DTA field includes the actual data which is to be delivered to the HOST1.

Figure 4L:
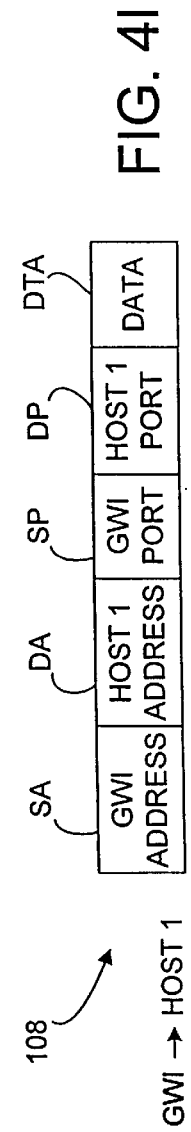

The packet 106 is then transmitted to the GATEWAY1. The GATEWAY1 receives the packet 106 and in response to the SEND_DATA command looks up the virtual circuit entry in its virtual circuit table corresponding to the information included in the VCID, SID and SOID fields of the packet 106. Based on this information the GATEWAY1 obtains the address information of the HOST1 from the corresponding mobile entry in its virtual circuit table. The GATEWAY1 then generates a packet 108 as shown in FIG. 4l to be sent to the HOST1. The SA field and SP field correspond to the address and port of the GATEWAY1. It is noted that the port utilized by the GATEWAY1 to communicate directly with the HOST1 (or other device) is selected by the GATEWAY1 so as to be unique to the corresponding socket of the virtual circuit. The DA field and DP field correspond to the address and port of the HOST1 as previously obtained and stored in the virtual circuit table. The DTA field contains the data included in the DTA field in the packet 106 from the mobile terminal 36. It is noted that the packet 108 follows a conventional format native to the end point with which the mobile terminal 36 is communicating.

Figure 4M:
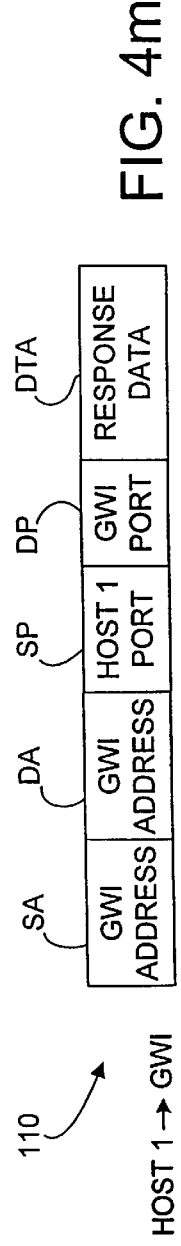
Figure 4N:
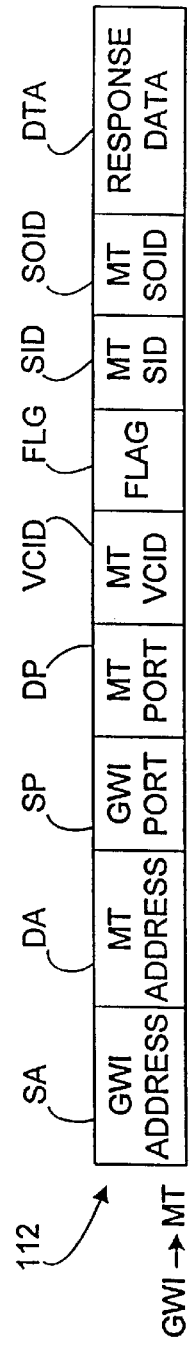

FIG. 4m represents a packet 110 indicative of a communication sent back to the GATEWAY1 by the HOST1 in response to the packet 108. The DTA field of the packet 110 includes appropriate response data which ultimately is intended for the mobile terminal 36. Since the port identified in the DP field is selected to be unique to a given socket in the virtual circuit table of the GATEWAY1, the GATEWAY1 identifies such socket based on the information stored in the table as discussed above. From the unique gateway port, the GATEWAY1 is able to identify the VCID, SID and SOID of the mobile terminal 36 from the virtual circuit table. The GATEWAY1 then generates a packet 112 as shown in FIG. 4n which is to be transmitted back to the mobile terminal 36.

The packet 112 includes the address and port of the mobile terminal 36 in the DA and DP fields, respectively, as obtained from the mobile entry of the virtual circuit table of the GATEWAY1. The DTA field includes the data from the DTA field received in the packet 110 from the HOST1.

Accordingly, communications between the mobile terminal 36 and the HOST1 can remain ongoing via an exchange of packets as represented in FIGS. 4k–4n. The GATEWAY1 simply determines where to direct a received packet based on the contents of its virtual circuit table.

Roaming: LAN to LAN

Of course, there is the possibility that the mobile terminal 36 will roam to another LAN (e.g., LAN2) as outlined above. However, as will be apparent such roaming does not have an adverse affect on the virtual circuits formed via the GATEWAY1. Namely, referring back to FIG. 2 assume that the mobile terminal 36 does roam from LAN1 to LAN2. Such roaming is detected in step 72 and the mobile terminal 36 registers with a new access point (e.g., AP2) and obtains a new network identification (e.g., MT ADDRESS* and MT PORT*) (steps 74 and 76). However, the contents of the virtual circuit table (FIG. 5a) of the mobile terminal 36 remain unchanged.

Figure 4O:
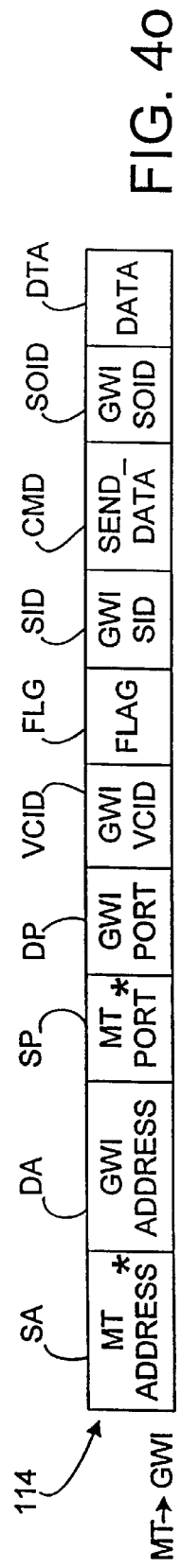

Hence, suppose the mobile terminal 36 wants to continue communicating with the HOST1 in LAN1. The mobile terminal 36 simply generates a packet 114 as shown in FIG. 4o. The source address SA and source port SP fields in the packet 114 will reflect the new network address of the mobile terminal 36 as a result of roaming to LAN2. However, the mobile terminal 36 continues to communicate with the HOST1 via the GATEWAY1 and the specific virtual circuit. Namely, the packet 114 includes the address and port of the GATEWAY1 in the DA and DP fields as shown. In addition, the packet 114, similar to the packet 106, includes the GW1 VCID, GW1 SID and GW1 SOID in the respective fields identifying the particular virtual circuit. The CMD field contains the same "SEND_DATA" command as the packet 106, and the data which is to be transmitted to the HOST1 is included in the DTA field. In addition, though, the packet 114 includes the flag field FLG in which the flag is set to indicate to the GATEWAY1 that the address of the mobile terminal 36 has changed. The packet 114 is then sent to the GATEWAY1 via the access point AP2 and known routing techniques across the WAN 22.

The GATEWAY1 in turn receives the packet 114 and processes the packet in the same manner described above in relation to packet 106 (FIG. 4k) with the following exception. The GATEWAY1 detects from the FLG field that the address of the mobile terminal 36 has changed. In response, the GATEWAY1 updates its virtual circuit table (FIG. 5b) so as to now include the updated address of the mobile terminal 36 in the corresponding mobile entry. Such updated address is obtained via the SA field and SP field of the packet 114. Otherwise, the GATEWAY1 continues to act as an intermediary and forwards the data in the DTA field to the HOST1 in a packet in the exact same manner as described above in relation to packet 108 (FIG. 4l). In other words, the same procedures described above in relation to FIGS. 4k–4n are repeated. In this manner, the HOST1 is able to continue communicating with the mobile terminal 36, and vice versa, regardless of the fact that the network address of the mobile terminal 36 has changed. In situations where the mobile terminal 36 roams to another LAN but does not need to communicate with the HOST1 immediately, the mobile terminal 36 in the present embodiment is configured to send a gratuitous update packet to the GATEWAY1 in which the FLG field is set so that the GATEWAY1 can immediately update is tables and continue forwarding packets to the mobile terminal 36. Accordingly, seamless roaming is achieved.

Figure 6:
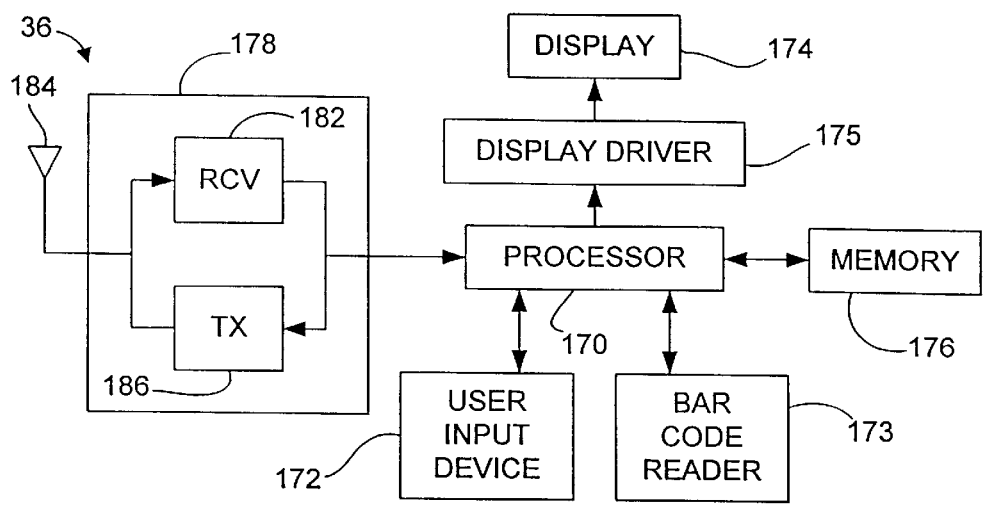
FIG. 6 is a block diagram of a mobile terminal in accordance with the present invention.

FIG. 6 is a block diagram representing the basic structure of the mobile terminals 36 according to the exemplary embodiment. Each mobile terminal 36 includes a processor 170 which can be programmed to control and to operate the various components within the mobile terminal 36 in order to carry out the various functions described herein. The processor 170 is coupled to an operator input device 172 which allows an operator to input data to be communicated to the corresponding LAN such as inventory data, patient information, etc. This information may be sent to the host computer 42 which serves as a central data location, for example, or to a cash register connected to the network backbone 26, as another example, for providing price information. The input device 172 can include such items as a keypad, touch sensitive display, etc. The mobile terminal 36 also may include a bar code scanner 173 coupled to the processor 170 for providing another form of data input. A display 174 is also connected to and controlled by the processor 170 via a display driver circuit 175. The display 174 serves as a means for displaying information stored within the mobile terminal 36 and/or received over the network backbone 26 via an access point 28. The display 174 can be a flat panel liquid crystal display with alphanumeric capabilities, for example, or any other type of display as will be appreciated.

A memory 176 is included in each mobile terminal 36 for storing program code executed by the processor 170 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 176 also serves as a storage medium for storing the above described virtual circuit table for the mobile terminal 36.

Each mobile terminal 36 also includes its own RF section 178 connected to the processor 170. The RF section 178 includes an RF receiver 182 which receives RF transmissions from an access point 28 and via an antenna 184 and demodulates the signal to obtain the digital information modulated therein. An example of a suitable RF receiver 182 for use in the mobile terminal 106 is the Model 025 Direct Sequence Spread Spectrum Radio Module, which is commercially available from Aironet Wireless Communications, Inc. of Akron, Ohio.

The RF section 178 also includes an RF transmitter 186. In the event the mobile terminal 106 is to transmit information to a LAN in response to an operator input at input device 172, for example, the processor 170 forms within the memory 176 the aforementioned information packets. The information packets are delivered to the RF transmitter 186 which transmits an RF signal with the information packet modulated thereon via the antenna 184 to the access point 28 with which the mobile terminal 36 is registered.

Figure 7:
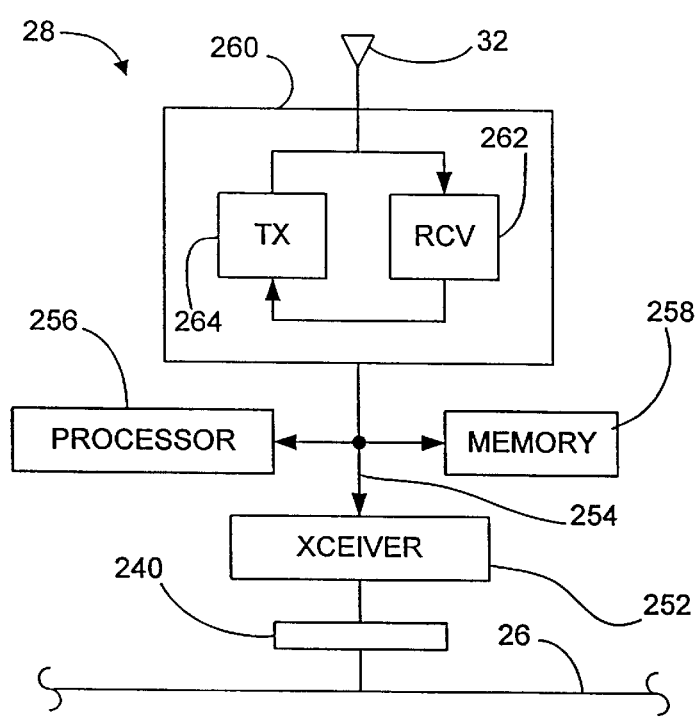
FIG. 7 is a block diagram of an access point in accordance with the present invention.

Referring now to FIG. 7, a block diagram representative of each access point 28 is shown. Each access point 28 is connected to the network backbone 26 via a connector 240 such as a DB-9 or RJ-45 connector. The connector 240 is connected to the network backbone 26 at one end and to a network adapter transceiver 252 included in the base station 108 at the other end. The network adapter transceiver 252 is configured according to conventional network adapter transceiver techniques to allow the access point 28 to communicate over the network backbone 26. The network adapter transceiver 252 is also connected to an internal bus 254 included within the access point 28. The access point 28 further includes a processor 256 connected to the bus 254 for controlling and carrying out the operations of the access point 28. The processor 256 may include any of a variety of different microprocessors, such as the Motorola 68360 (25 MHz) or Intel 80386 microprocessors.

The access point 28 also includes a memory 258 connected to the bus 254. The memory 258 stores program code executed by the processor 256 to control the other elements within the access point 28 to carry out the functions described herein. It will be readily apparent to a person having ordinary skill in the art of computer programming how to program the processor 256 and the other elements within the access point 28 to carry out the operations described herein using conventional programming techniques based on the flowcharts and descriptions provided herein. As a result, additional detail as to the specific program code has been omitted. Moreover, the memory 258 functions to store information tables maintained by the processor 256 including information such as a list of the mobile terminals 36 which are currently registered with the access point 28.

Also connected to the bus 254 is an RF section 260 included in the access point 28. The RF section 260 includes the aforementioned antenna 32 for receiving radio signals from and transmitting radio signals to mobile terminals 36 within the cell area of the access point 28. Information transmitted from a mobile terminal 36 is received via the antenna 32 and is processed by an RF receiver 262 which demodulates and decodes the signal and converts the information to a digital signal having the aforementioned packet format. Thereafter, the processor 256 stores the packet in the memory 258 until such time as the base station 108 is able to transmit the information packet onto the network backbone 26 via the network adapter transceiver 252 and connector 240.

Information packets which are transmitted to the access point 28 via the network backbone 26 for transmission to a mobile terminal 36 are received by the network transceiver 252. The processor 256 controls an RF transmitter 264 included in the RF section 260, the RF transmitter 264 also being connected to the bus 254. The processor 256 causes the RF transmitter 264 to modulate an RF signal using spread spectrum techniques, for example, which in turn carries the information packet to the appropriate mobile terminal 36.

Figure 8:
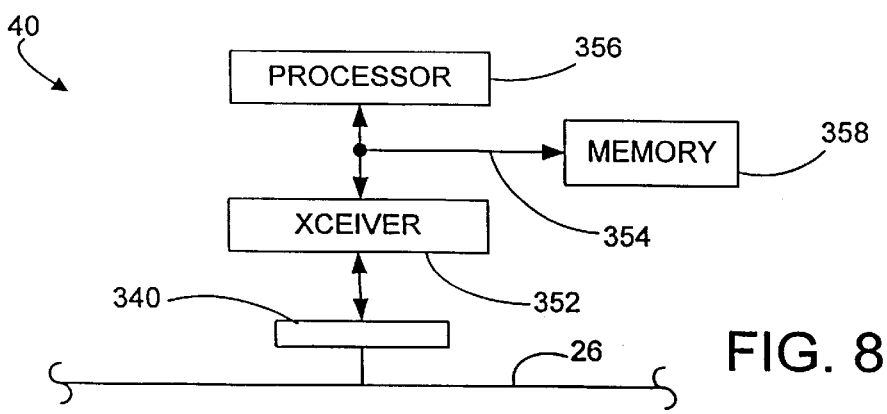
FIG. 8 is a block diagram of a gateway in accordance with the present invention.

FIG. 8 represents a block diagram of a gateway 40 in accordance with the present invention. Each gateway 40 is connected to the network backbone 26 via a connector 340 such as a DB-9 or RJ-45 connector. The connector 340 is connected to the network backbone 26 at one end and to a network adapter transceiver 352 included in the gateway 40 at the other end. The network adapter transceiver 352 is configured according to conventional network adapter transceiver techniques to allow the gateway 40 to communicate over the network backbone 26. The network adapter transceiver 352 is also connected to an internal bus 354 included within the gateway 40. The gateway 40 further includes a processor 356 connected to the bus 354 for controlling and carrying out the operations of the gateway 40.

The gateway 40 also includes a memory 358 connected to the bus 354. The memory 358 stores program code executed by the processor 356 to control the other elements within the gateway 40 to carry out the functions described herein. It will be readily apparent to a person having ordinary skill in the art of computer programming how to program the processor 356 and the other elements within the gateway 40 to carry out the operations described herein using conventional programming techniques based on the flowcharts and descriptions provided herein. As a result, additional detail as to the specific program code has been omitted. Moreover, the memory 358 functions to store the aforementioned virtual circuit table (FIG. 5b) for the gateway 40.

Reverse Direction Initiation

The above-discussed example relates to the situation where the mobile terminal 36 initiates communication with another device (e.g., HOST1). In accordance with another embodiment of the invention, a device such as the host computer 42 may likewise initiate communication with a mobile terminal 36. Generally speaking, each mobile terminal 36 may establish what is referred to herein as a reverse direction communication link with a corresponding gateway 40 as part of its operation procedure. As a result of such operation procedure, the gateway 40 is readied to act as an intermediary between the mobile terminal 36 and any device in the system 20 which may want to initiate communication with the mobile terminal 36. The DNS 44 or other name resolver responsible for the particular mobile terminal 36 is updated with the network address of the mobile terminal 36 from the point of view of the gateway 40 as a result of the mobile terminal 36 desiring to accept information or incoming connections from an initiating device or host computer 42. Devices desiring to communicate with a particular mobile terminal 36 initially query the DNS 44 or other name resolver to obtain the network address of the particular mobile terminal 36, such network address actually being a "virtual" address representative of the mobile terminal 36 as provided by the gateway 40 as discussed below. The DNS 44 or other name resolver provides such address to the initiating device.

Thereafter, the intiating device transmits a packet directed to the virtual address of the particular mobile terminal 36 as obtained from the DNS 44. The gateway 40 is configured to receive any packets directed to a virtual address of a mobile terminal 36 in its virtual circuit table. The gateway 40 then forwards the packet to the mobile terminal 36 via its virtual circuit. The mobile terminal 36 in turn responds to the packet by transmitting a packet to the gateway 40 via the virtual circuit. The gateway 40 thereafter forwards the response packet to the initiating device with the source address field set to the virtual address. The gateway 40 maintains the current network address of the mobile terminal 36 even as the mobile terminal 36 roams from LAN to LAN as described above. Hence, the gateway 40 is able to continuously forward packets directed to the mobile terminal's 36 virtual address to the mobile terminal itself.

Figure 9A:
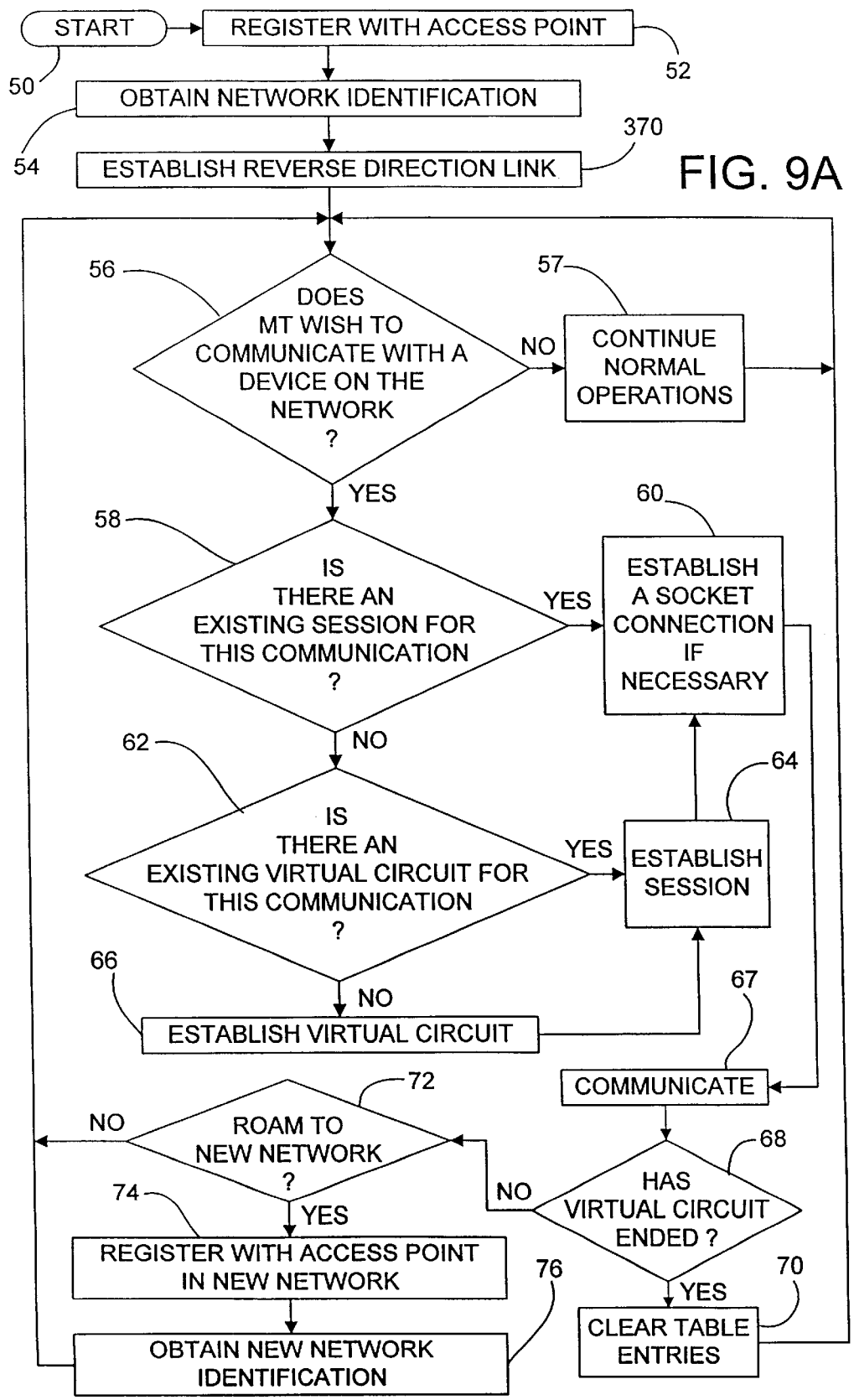
FIG. 9A is a flowchart describing, in relevant part, the general operation of the mobile communication system in accordance with another aspect of the present invention.

Referring initially to FIG. 9A, a flowchart describing the general operation of the mobile communication system in accordance with such embodiment is shown. Those steps which are substantially similar to the steps shown in FIG. 2, and discussed above, share the same reference numerals. Hence, only the differences will be discussed herein. As shown in FIG. 9A, each mobile terminal 36 proceeds to step 370 following step 54. In step 370 a mobile terminal 36 establishes a reverse direction communication link with a gateway 40. The details of step 370 are described below in connection with FIG. 9B. Thereafter, the mobile terminal 36 is able to receive communications initiated by other devices. The mobile terminal 36 and system then proceeds to steps 56 et seq.

Figure 9B:
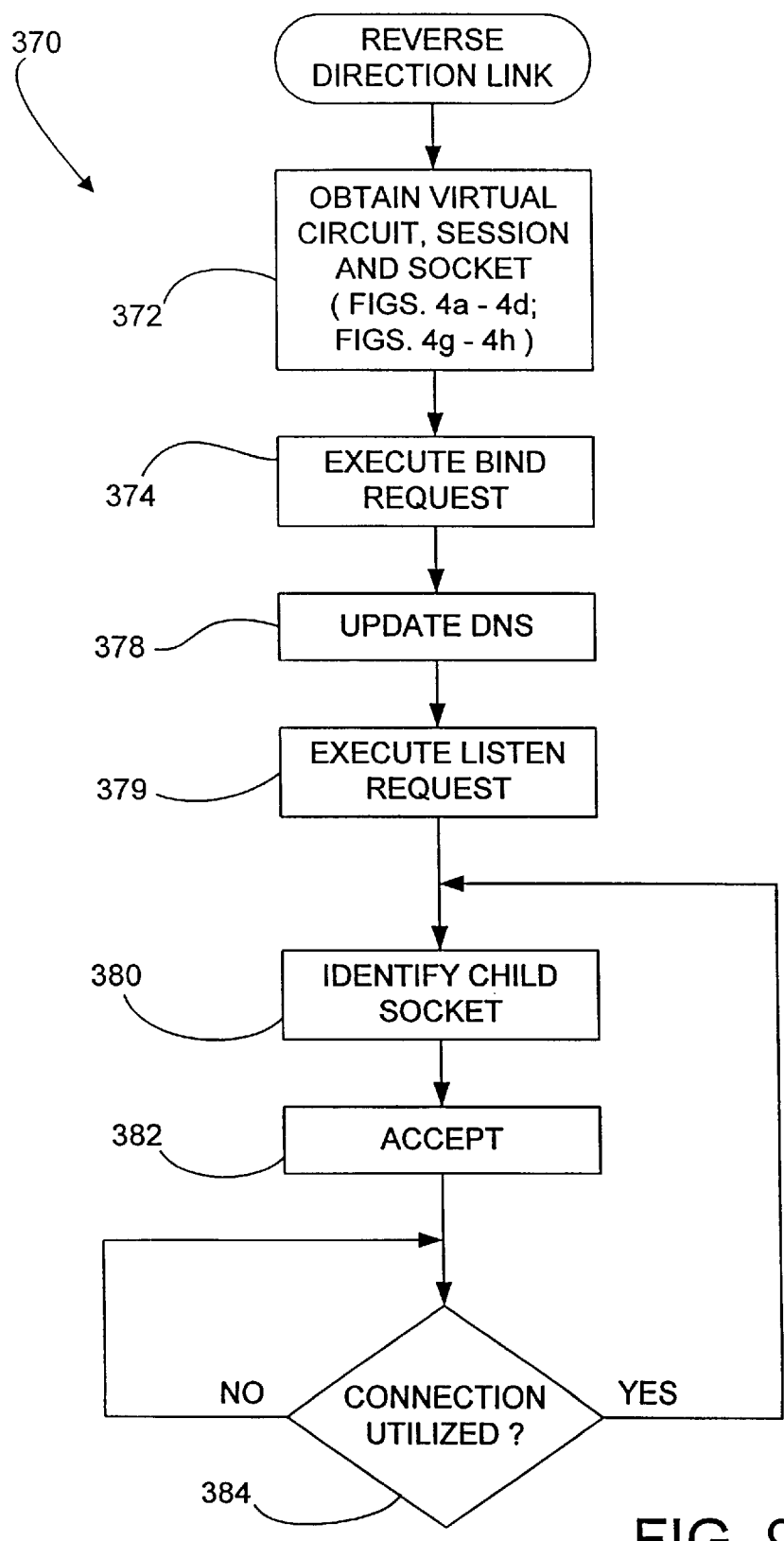
FIG. 9B is a flowchart describing a routine for establishing a reverse direction link in accordance with the present invention.

FIG. 9B illustrates in detail step 370 for establishing the reverse direction communication link. Beginning in step 372, an exemplary mobile terminal 36 and gateway 40 (e.g., GATEWAY1) establish a virtual circuit (VCID), session (SID) and socket (SOID). The virtual circuit, session and socket are established by exchanging packets and information in the manner described above in relation to FIGS. 4a–4d and 4g–4h. Note for purposes of establishing the reverse direction communication link the mobile terminal 36 allocates a socket end point with the gateway 40 independent of any particular end device. Thus, the packets described above with respect to FIGS. 4e and 4f are not relevant in the present situation. Next, in step 374 the mobile terminal 36 and GATEWAY1 execute a bind request/response transaction as is discussed more fully below in accordance with FIGS. 10a and 10b. The bind request/response transaction establishes the virtual identity that the GATEWAY1 uses to impersonate the mobile terminal 36 for purposes of receiving unsolicited information and connections. In the exemplary embodiment, the bind request is referenced to a specific port number although other demultiplexing identifiers could be used other than port numbers in another embodiment.

Following step 374, the GATEWAY1 responds to the bind request in step 378 by updating the DNS 44 (e.g., DNS1) or other name resolver responsible for providing the name to network address mapping for the mobile terminal 36. Specifically, the GATEWAY1 updates the DNS1 with the virtual address assigned by the GATEWAY1 for the name corresponding to mobile terminal 36. This virtual address for the mobile terminal 36 uniquely identifies the mobile terminal 36 for the duration of the session. Such updating of the DNS 44 or other name resolver is performed using known techniques.

Following step 378, in step 379 the mobile terminal 36 and the GATEWAY1 execute a listen request/response transaction as is described in more detail below in relation to FIGS. 10c–10d. The listen request/response transaction is utilized to inform the GATEWAY1 of the mobile terminal's 36 willingness to receive unsolicited information and/or connections via the gateway.

Consequently, when a device in the system queries the DNS1 for the address of the mobile terminal 36 using known network techniques, the DNS1 provides the querying device with the virtual address of the mobile terminal 36. In the present invention the network address of the mobile terminal 36 as stored in the DNS1 is its virtual address identified by the GATEWAY1. The GATEWAY1 is configured to listen for any information directed to a mobile terminal's 36 virtual address included in its virtual circuit table (FIG. 5b). Using known techniques, the GATEWAY1 receives the information directed to the virtual address of the mobile terminal 36 by accepting connections and/or information from devices initiating communications directed to the virtual address of the mobile terminal 36. In turn, the GATEWAY1 forwards the information to the mobile terminal via the corresponding virtual circuit connection previously established between the GATEWAY1 and the mobile terminal 36. The mobile terminal 36 may respond to such information and if it does its via the GATEWAY1. If the mobile terminal 36 responds, the GATEWAY1 receives the response information from the mobile terminal 36 and forwards such information to the initiating device. In the event the mobile terminal 36 then roams to another LAN or WAN and receives another network address (e.g., steps 72, 74 and 76 in FIG. 9A), the mobile terminal 36 updates the GATEWAY1 with its new address via the flag field FLG as described above in relation to FIG. 4o.

Following steps 378 and 379 in FIG. 9B, the mobile terminal 36 in step 380 sends information to the GATE- WAY1 identifying a child socket end point that will be utilized by the GATEWAY1 when initiating devices attempt to communicate with the mobile terminal 36. (See, e.g., FIG. 10e discussed below). The GATEWAY1 logs the child socket end point into its virtual circuit table for the corresponding (parent) socket end point established in step 372. For a given (parent) socket created in step 372 there may be multiple child socket end points allocated. The child socket (s) are used to uniquely identify communication relationships between the mobile terminal 36 and an initiating device. Each child socket, once utilized, becomes a completed socket end point and, if necessary, the mobile terminal 36 may create a new child socket if it desires to establish additional communication relationships.

Following step 380, the mobile terminal 36 in step 382 issues (see, e.g., FIG. 10e) "ACCEPT" commands to the GATEWAY1 indicating that the mobile terminal 36 is prepared to receive any unsolicited connection(s) via the specified child socket. When multiple devices try to communicate with the mobile terminal 36, the GATEWAY1 provides the resources to handle up to a bounded number of simultaneous unsolicited requests, whereby such number may be specified by the mobile terminal 36. In order to handle multiple requests, the GATEWAY1 queues connection requests from the initiating device(s). Each time an initiating device attempts to establish a connection with the mobile terminal 36, the GATEWAY1 establishes a relationship between the incoming connection request and an available child socket. After the GATEWAY1 establishes the relationship, it completes the accept transaction with the mobile terminal 36. Upon detecting that all the child socket identifiers are consumed, the mobile terminal 36 may return to step 380.

It is noted that the example described herein is based on a connection type protocol. In another embodiment, a connectionless protocol may be used to establish the respective links. In such case, it will be appreciated that only the bind request/response transaction would be necessary.

FIG. 10a illustrates an exemplary packet 390 sent by the mobile terminal 36 to the GATEWAY1 in step 374 (FIG. 9B) in order to initiate a bind request. The SA, DA, SP, DP, VCID, FLG, SID and SOID fields are all ascertained and utilized in the same manner as described above in connection with the previous embodiment. The CMD field includes the command "BIND_REQUEST" which notifies the GATEWAY1 that the packet 390 represents a bind request. The packet 390 also includes a field PORT in which the mobile terminal 36 identifies a particular port to which communications are to be directed.

In response, the GATEWAY1 initializes itself for establishing a reverse communication link and sends the mobile terminal 36 a bind reply packet 392 a shown in FIG. 10b. In this case, the CMD field includes the command "BIND_REPLY" which notifies the mobile terminal 36 that the bind request has been received and processed.

FIG. 10c illustrates a packet 394 sent by the mobile terminal 36 to the GATEWAY1 in step 379 as part of executing the listen request. The CMD field includes the command "LISTEN_REQUEST" which prompts the GATEWAY1 to prepare itself to receive unsolicited connections intended for the mobile terminal 36. Specifically, the GATEWAY1 assigns a unique virtual address to the mobile terminal 36 and informs the DNS1 or other name resolver of the mobile terminal's 36 virtual address.

FIG. 10d illustrates a packet 398 sent by the GATEWAY1 to the mobile terminal 36 in step 379 in response to the listen request packet 394. The CMD field includes the command "LISTEN_REPLY" which is intended to inform the mobile terminal 36 that the listen request has been received and processed. FIG. 10e exemplifies a packet 400 sent by the mobile terminal 36 to the GATEWAY1 in step 380. The DTA field includes the particular child socket(s) identified by the mobile terminal 36 as part of step 380. The CMD field includes the command "ACCEPT" which notifies the GATEWAY1 that the mobile terminal 36 is ready to accept any connections initiated by another device.

FIG. 10f represents a packet 406 generated by the GATEWAY1 in response to the packet 400 in step 382 (FIG. 9B). The CMD field includes the command "ACCEPT_RESPONSE" to notify the mobile terminal 36 that the communications relationship between the GATEWAY1 and the initiating device is established.

At such time when the mobile terminal 36 actually wants to receive any data from the GATEWAY1, the mobile terminal 36 will generate and send a packet 407 as shown in FIG. 10f to the GATEWAY1. The CMD field includes the command "RECEIVE_DATA" which informs the GATEWAY1 that the mobile terminal 36 presently is waiting to receive data which the GATEWAY1 receives from an initiating device.

For sake of example, suppose that the host computer HOST1 then wishes to initiate communication with the mobile terminal 36. Typically, the device attempting to initiate the communication with the mobile terminal 36 will not know the network address of the mobile terminal 36 beforehand. Accordingly, the HOST1 queries the DNS1 or other name resolver, using conventional techniques, for the network address of the mobile terminal 36. As is conventional, the DNS1 looks to its table (FIG. 11) to find the corresponding address for the mobile terminal 36 (which is actually the "virtual" address as provided by the GATEWAY1). The DNS1 then responds to the HOST1 with the "virtual" address of the mobile terminal 36.

FIG. 10g represents a packet 408 which is then sent by the HOST1 "to" the mobile terminal 36. The destination address in the DA field is the virtual address of the mobile terminal 36 as provided to the HOST1 by the DNS1 or other name resolver. The port number in the DP field is the port number for the mobile terminal 36 as provided by known standards or predetermined application end points. The DTA field of the packet 408 includes information the HOST1 intends to send to the mobile terminal 36. The GATEWAY1 is configured to receive network transmissions directed to mobile terminals virtual addresses by virtue of recognizing the virtual addresses included therein. Hence, the GATEWAY1 will receive the packet 408 based on its being addressed to the virtual address of the mobile terminal 36.

The GATEWAY is configured to generate and transmit a packet 410 in response to the packet 408 as shown in FIG. 10h. The packet 410 is directed to the mobile terminal 36 via the virtual circuit connection and corresponding receive request 407. The DTA field includes the data received by the GATEWAY1 from the HOST1 in the packet 408. The CMD field includes the command "RECEIVE_RESPONSE" indicating the nature of the packet.

Figure 10I:
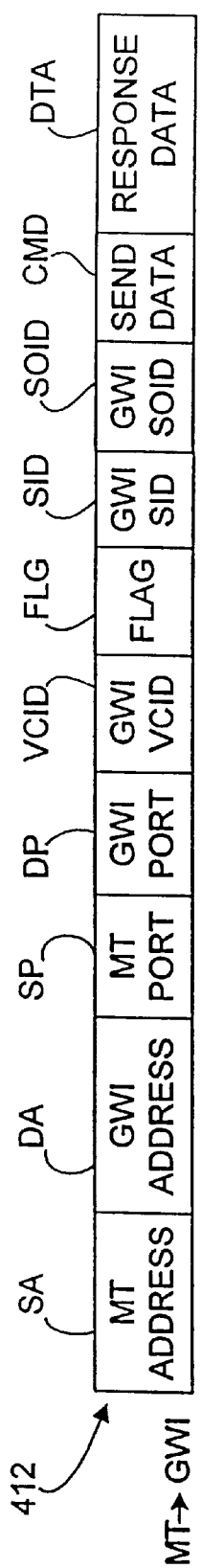

The mobile terminal 36 receives the packet 410 and processes the data in accordance with the particular application being carried out by the mobile terminal. Upon completion of such processing, the details of which are not relevant to the invention, the mobile terminal 36 may generate a response packet 412 as represented in FIG. 10i. The response packet 412 is sent from the mobile terminal 36 to the GATEWAY1 and includes in the DTA field the response data intended to be forwarded to the HOST1. The CMD field includes the command "SEND_DATA" indicating that the data is intended to be forwarded. The GATEWAY1 receives the packet 412 and based on the SOID field knows which device (e.g., the HOST1) the response data is to be forwarded to.

Figure 10J:
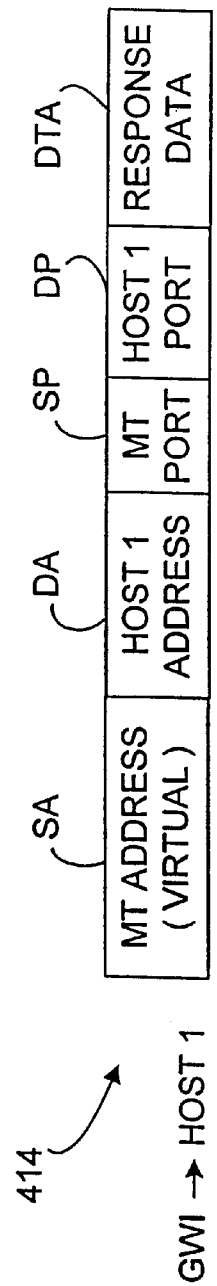

Consequently, the GATEWAY1 proceeds to generate a packet 414 as shown in FIG. 10j which is then sent from the GATEWAY1 to the HOST1. The DTA field of the packet 414 includes the response data received by the GATEWAY1 in the response packet 412. The packet 414 includes the virtual address of the mobile terminal 36 in the source address (SA) field so as to appear as if the packet originates from the mobile terminal 36 itself, at least from the perspective of the HOST1. Thus, the response data from the mobile terminal 36 is forwarded to the HOST1.

It will therefore be appreciated that the subject embodiment of the present invention allows for a device such as a host computer or the like to initiate communication with the mobile terminal 36 via the gateway 40. If the mobile terminal roams from one LAN to another, the contents of the gateway 40 are updated to reflect the new address of the mobile terminal 36, if any. Specifically, the mobile terminal 36 notifies the gateway 40 of its new address via a notification packet with the FLG set to indicate a new address. The gateway 40 in turn updates the actual address for the mobile terminal 36 in its tables. As a result, packets which continue to be directed to the mobile terminal 36 from other devices via the virtual address utilized by the gateway 40, will be forwarded to the new address of the mobile terminal 36 by the gateway 40. Thus, seamless communication is achieved both for communications initiated by the mobile terminal 36 and communications initiated by another device.

Once a session between a mobile terminal 36 and a network device is established through the local gateway 40, it will be appreciated that existing communications therebetween will always be through that particular gateway 40 even if the mobile terminal 36 moves to another LAN, for example. On the other hand, new communication sessions may be established through a new gateway 40 in the LAN to which the mobile terminal has roamed.

Roaming: LAN to WAN

Figure 13:
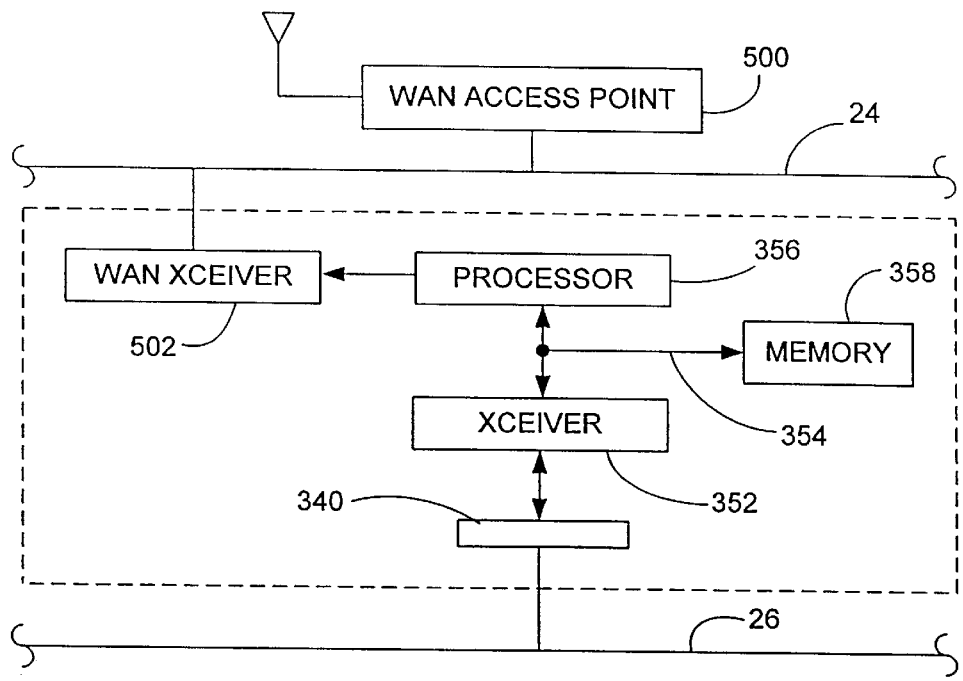
FIG. 13 is a block diagram of a gateway in accordance with another embodiment of the present invention.

FIGS. 12–13 relate to an embodiment of the present invention in which mobile terminals 36 may roam from LAN to WAN seamlessly. In this embodiment, the WAN backbone 24 includes WAN access points 500 distributed throughout as represented in FIG. 13. The WAN access points 500 are distributed throughout the WAN backbone 24 area similar to the access points 28 being distributed throughout the various LANs as discussed above. The WAN access points 500 are operationally similar to the access points 28, but cover substantially broader cell areas which encompass the WAN. Each gateway 40 is coupled via a hardwired or wireless connection with the WAN backbone 24 via a WAN network adapter transceiver 502 included in the gateway 40.

Each WAN access point 500 includes a WAN transceiver (not shown) having an RF receiver and transmitter for receiving and transmitting information packets similar to the RF sections 178 and 260 in the mobile terminals and access points 28. The WAN transceiver, however, preferably is designed to operate in a different radio band compared to the RF sections 178 and 260. Preferably the range of the WAN transceiver is large enough to cover an area encompassing a plurality of LANs or more in the system 20 (FIG. 1).

Figure 14:
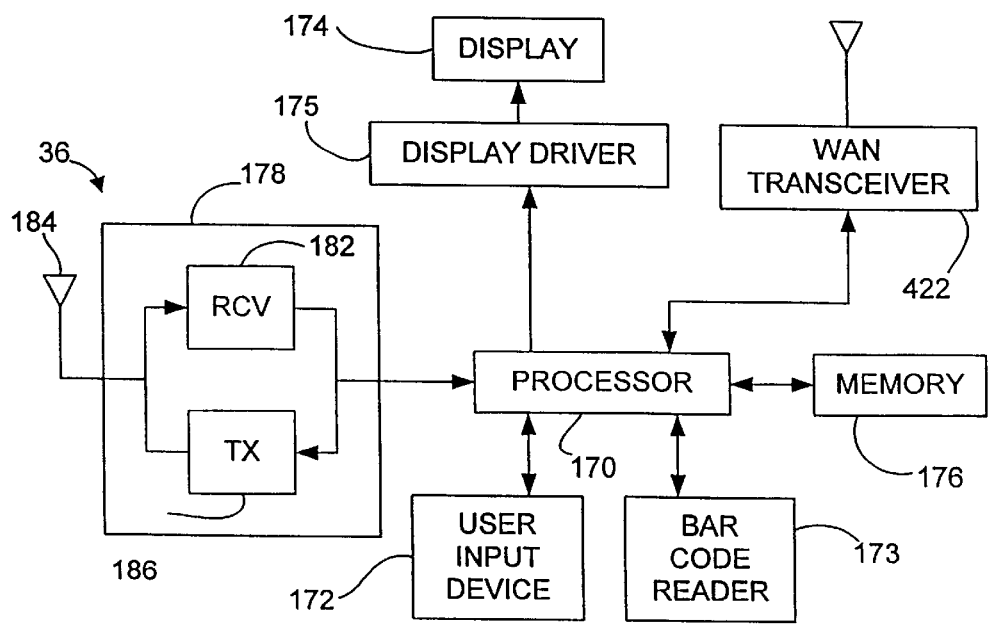
FIG. 14 is a block diagram of a mobile terminal in accordance with another embodiment of the present invention.

Each of the mobile terminals 36 preferably has a WAN transceiver 422 also as represented in FIG. 14. Each WAN transceiver 422 includes an RF receiver and transmitter and is configured so as to be able to communicate with the WAN transceivers of each of the respective WAN access points 500 in the same radio band.

In the event a mobile terminal 36 is unable to maintain registration with an access point 28 as it roams about the system 20, this embodiment of the invention allows the mobile terminal 36 to reestablish a communication link via its WAN transceiver 422 and a corresponding WAN transceiver in a neighboring WAN access point 500. For example, FIG. 12 illustrates a routine which is carried out within the system 20 between steps 74 and 76 represented in FIG. 2. In step 74, the mobile terminal 36 attempts to register with a new LAN upon determining that it has roamed to a new network as discussed above in relation to step 72. In step 450, the mobile terminal 36 determines if it was able to register successfully with an access point 28 as a result of step 74. If yes, the mobile terminal 36 proceeds to step 76 in FIG. 2.

In the event registration was not successful as determined in step 450, the mobile terminal 36 proceeds to step 452. In step 452 the mobile terminal 36 attempts registration within the WAN by using registration techniques known in the art, and hence further detail is omitted.

Next, in step 454 the mobile terminal 36 determines if it was able to successfully register with a WAN access point 500 as a result of step 452. If yes, the mobile terminal 36 proceeds to step 456 in which it may obtain a new address from the WAN using conventional techniques. Thereafter, the mobile terminal 36 proceeds to step 458 in which it transmits via its WAN transceiver 422 and the access point 500 with which it registered, a media change notification packet directed to the gateway(s) 40 with which the mobile terminal 36 had established virtual circuit connections. The media change notification packet includes routing information for the mobile terminal 36, which may be new as a result of the registration procedure. In addition, the media change notification packet may include particular transmission characteristic criteria specific to the operation of the WAN transceiver 422 (e.g., packet length limits, latency times, etc.). A gateway 40 receiving such information is configured to then update its virtual circuit table (FIG. 5b) with the new routing information and transmission characteristics for the mobile terminal. Hence, the virtual circuits with the various mobile terminals may be maintained.

Following step 458, the mobile terminal 36 returns to step 56 as shown in FIG. 2. If in step 454 registration on the WANs is riot successful, the mobile terminal 36 proceeds to step 464 in which it returns to step 50 (FIG. 2) and the mobile terminal 36 begins the registration procedure from the beginning.

Accordingly, even if a mobile terminal 36 is unable to roam seamlessly from one LAN to another LAN, the present invention permits seamless roaming from a LAN to a WAN, WAN to LAN and WAN to WAN. Moreover, if the mobile terminal 36 is registered to a gateway 40 and subsequently goes out of range as determined in step 72, for example, the mobile terminal 36 repeats the procedure shown in FIG. 12. Consequently, the mobile terminal 36 may seamlessly roam from the WAN back to a LAN.

Seamless Transistioning From Mobile Terminal to Mobile Terminal

Figure 15:
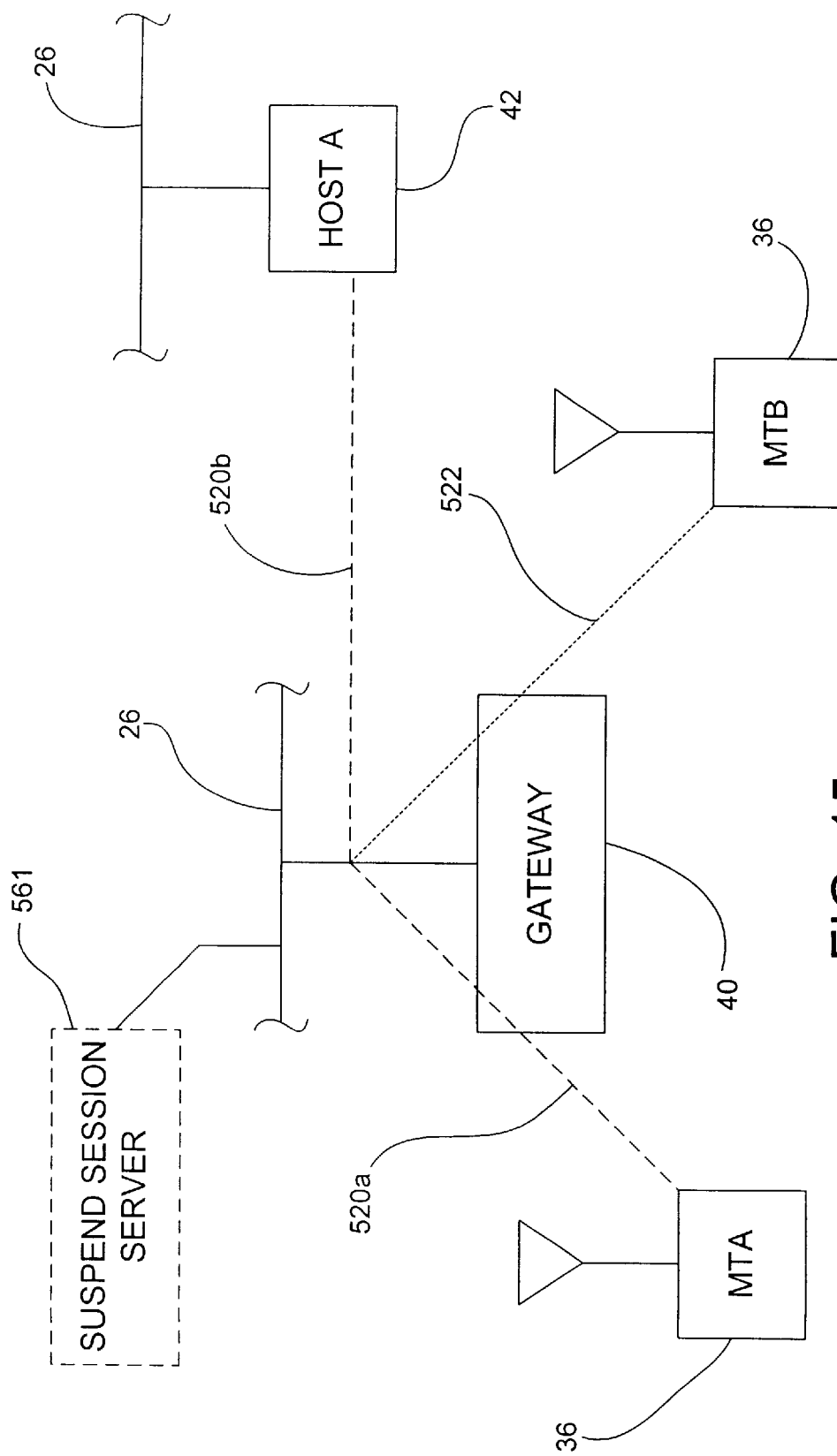
FIG. 15 is a block diagram representing schematically seamless transitioning between mobile terminals in accordance with another aspect of the invention.
Figure 16:
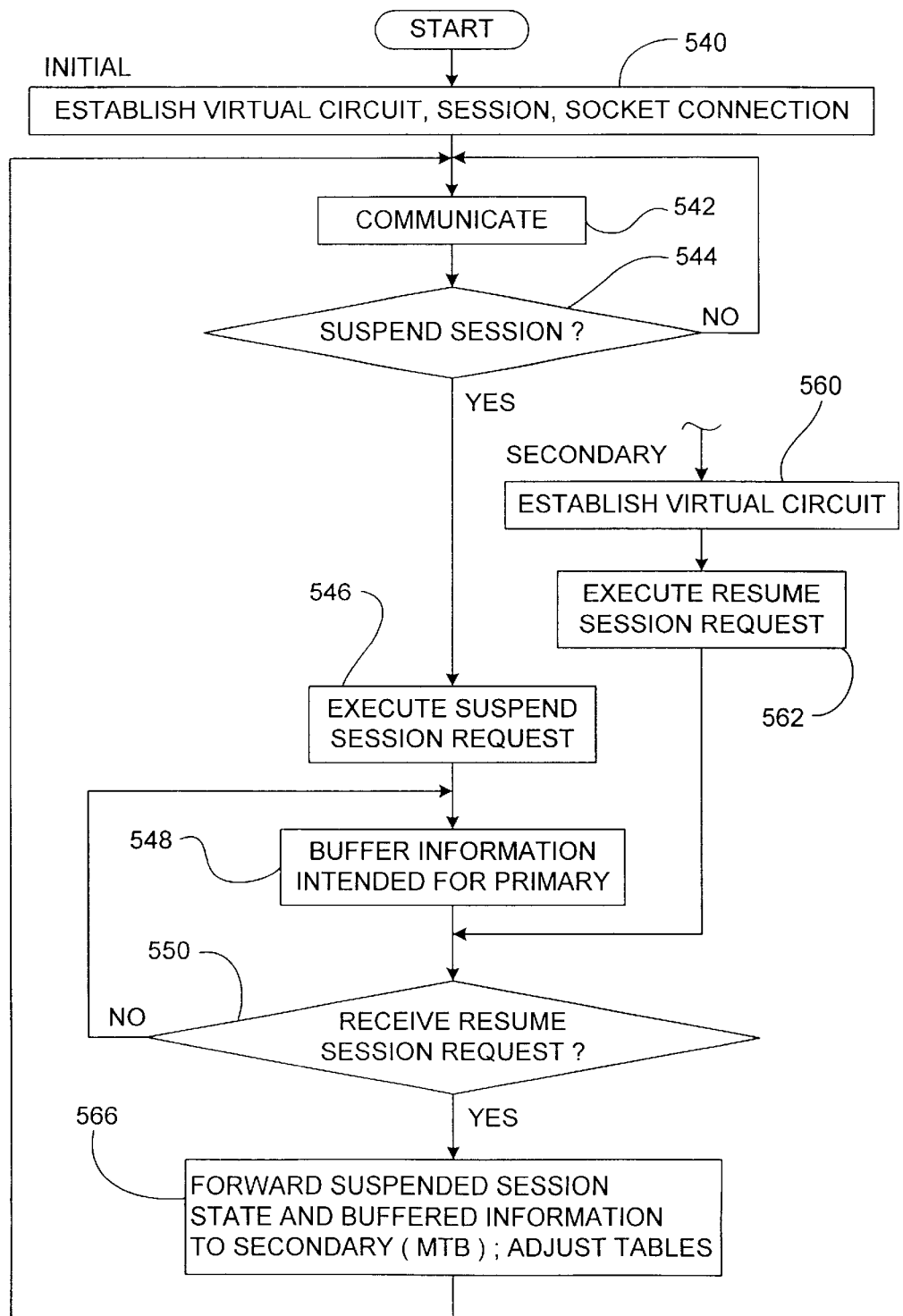
FIG. 16 is flowchart describing, in relevant part, the general operation of the mobile communication system in accordance with the seamless transitioning between mobile terminals in accordance with the present invention.

Referring now to FIGS. 15 thru 17, and initially to FIG. 15, the manner in which each gateway 40 may provide for seamless transitioning between mobile terminals 36 will now be described. For sake of example, it is assumed that a mobile terminal MTA has already established a communication link with a host computer HOSTA via a gateway 40.

The logical communication link, represented by dashed line 520, may have been initiated by either the mobile terminal MTA or the host HOSTA as described previously. Specifically, virtual circuit, session and socket are established via the gateway 40 by exchanging packets and information in the manner described above in relation to FIGS. 4a–4h, for example.

In essence, the communication link 520 comprises a communication link 520a between the mobile terminal MTA and the gateway 40, and a communication link 520b between the gateway 40 and the host computer HOSTA as exemplified above. The gateway 40 serves to route communications between the mobile terminal MTA and the host computer HOSTA using the information stored in its virtual circuit tables as previously discussed.

In accordance with the present invention, the operator of the mobile terminal MTA may desire to suspend a particular session so that the same operator or a different operator may resume the session using mobile terminal MTB. Various circumstances may arise where it is desirable to suspend the session involving mobile terminal MTA and resume the session using mobile terminal MTB. To accomplish this, as will be described in more detail below, the mobile terminal MTA transmits a suspend request packet to the gateway 40 notifying the gateway 40 of the desire to suspend the session. The gateway 40 in turn begins to store in memory any communications received from the host computer HOSTA which are intended for the suspended session on mobile terminal MTA.

Prior to or after the mobile terminal MTA suspending the session, the mobile terminal MTB establishes a communication link 522 with the gateway 40 itself. Specifically, a virtual circuit is established between the mobile terminal MTB and the gateway 40 itself by exchanging packets and information in the manner described above in relation to FIGS. 4a–4d and 4g–4h, for example. Upon establishing the communication link 522, the mobile terminal MTB transmits a packet to the gateway 40 requesting that the gateway 40 resume the session which had previously been established between the mobile terminal MTA and the host computer HOSTA. The gateway 40 is configured to resume the session with the mobile terminal MTB conducting communications in place of mobile terminal MTA as will be explained more fully below.

Thus, for example, communications for the suspended session from the host computer HOSTA which are intended for the mobile terminal MTA are transmitted along communication link 520b to the gateway 40. The gateway 40, configures itself to forward the communications to the mobile terminal MTB via the communication link 522 rather than forwarding the communications to the mobile terminal MTA. Similarly, communications now performed by the mobile terminal MTB for the resumed session, previously established with the mobile terminal MTA are transmitted from the mobile terminal MTB to the gateway 40 via the communication link 522. The gateway 40 then forwards the communications to the host computer HOSTA via the same communication link 520b previously used by the mobile terminal MTA for the suspended session. The transititioning of sessions is transparent to the host computer HOSTA.

Turning to FIG. 16, a flowchart describing the overall system operation is shown for providing seamless transitioning. Beginning in step 540, the "initial" mobile terminal (e.g., mobile terminal MTA) establishes a communication link with another device (e.g., host computer HOSTA) according to the procedures discussed above. As will be appreciated, the communication link will include a connection between the mobile terminal MTA and the gateway 40 identified by a particular virtual circuit ID, session ID and socket ID. In addition, the communication link will include a corresponding connection between the gateway 40 and the host computer HOSTA.

Following step 540, normal communications occur as described above as part of the session between the mobile terminal MTA and the host computer HOSTA as represented in step 542. At step 544, it is determined if the mobile terminal MTA wishes to suspend the particular session with the host computer HOSTA. For example, the mobile terminal MTA is configured to recognize a predefined key sequence actuated by the operator as a request to suspend the session. Provided in such example, the operator does not actuate such a key sequence, the system operation continues to loop through step 542 and communications continue as normal.

Should the operator of the mobile terminal MTA desire to suspend the session, the operator actuates the predetermined sequence of keys on the mobile terminal MTA. Such request to suspend the session is recognized as represented in step 544 and the system proceeds to step 546. In step 546, the mobile terminal MTA generates and transmits a suspend session request packet to the gateway 40 via the communication link established in step 540. The suspend session request packet includes the identification of the particular session to be suspended in its session ID field (SID). In addition, the suspend session request packet includes in its command field (CMD) the command "SUSPEND_SESSION" to notify the gateway 40 of the specific request. In response to receiving the suspend session request packet, the gateway 40 is configured to establish a queue in memory as represented in step 548. The gateway 40 then stores in memory the identity of the suspended session and any communications received from the host computer HOSTA intended for the mobile terminal MTA via the suspended session. Also as part of step 546, the gateway 40 generates and transmits a packet to the mobile terminal MTA to inform the mobile terminal MTA that the session has in fact been suspended (e.g., a packet including the command "SESSION_SUSPENDED" in the CMD field). To thwart security breaches, the gateway 40 may attempt to authenticate the request to suspend the session with the mobile terminal MTA prior to actually suspending the session. Such authentication may be carried out using known techniques.

Referring briefly back to FIG. 15, by suspending the session the mobile terminal MTA has effectively suspended the activity on the communication link portion 520a. The mobile terminal MTA may either remain in operation (e.g., with respect to any other communication relationships which may have been established), remain inactive, or simply be powered off.

Returning to FIG. 16, following step 548 the gateway 40 determines in step 550 whether it has received a packet requesting that a previously suspended session be resumed (e.g., from mobile terminal MTB). More specifically, suppose for example that the mobile terminal MTB is intended to resume the session suspended by the mobile terminal MTA as provided in the example discussed above. It is assumed that sometime prior to an iteration of step 550, the mobile terminal MTB will establish a connection with the gateway 40 itself as represented in step 560 (if such a connection has not been established already). In order to know what gateway 40 to establish the connection with in order to resume the session, the mobile terminal MTB must somehow determine which particular gateway 40 in the system was serving as the intermediary in the suspended session. In addition, the mobile terminal MTB must somehow determine the idenfication of the particular session which was suspended in order that it can request that the session be resumed. Such information may be ascertained, for example, as a result of the mobile terminal MTA displaying the session identification and the network address of the gateway 40 with which the session has been suspended as part of step 546. The operator of the mobile terminal MTA can then provide such information to the operator of the mobile terminal MTB so that the operator can input the information into the mobile terminal MTB as part of initializing for a request to resume a session in step 560. Alternatively, the system may include some type of SUSPENDED SESSION SERVER 561 (FIG. 15) (possibly implemented as part of the gateway 40) which can be queried by the mobile terminal MTB. The server 561 would provide information about the suspended sessions including the associated virtual circuits and the gateway. The gateways 40 would be configured to continously update this server. To avoid security breaches, the server 561 or the gateway 40 themselves may be configured to require some type of authentication from the mobile terminal prior to allowing a particular mobile terminal to receive information regarding suspended sessions. Again, such authentication can be carried out using known techniques. The operator of the mobile terminal MTB then selects the particular session which is to be resumed and the corresponding gateway 40 via the keypad or the like on the mobile terminal MTB.

Thus, in step 560 the mobile terminal MTB establishes a communication link (i.e., link 522 of FIG. 15) with the gateway 40 based on the above received information about the suspended sessions. Then, as part of step 562 the mobile terminal MTB generates and transmits a resume session request packet to the gateway 40. The command field CMD in the packet includes the command "RESUME_ SESSION" to inform the gateway 40 of the desire to resume a previously suspended session. Also included in the data field of the packet is the identity of the particular virtual circuit and session which was previously suspended and which is now to be resumed. The gateway 40 receives the resume session request packet following step 562, and based on such receipt the gateway 40 is configured to proceed from step 550 to step 566 upon authenticating the request.

In step 566, the gateway 40 transmits information to the mobile terminal MTB via the link established in step 560 (i.e., link 522). Such information is selected to be sufficient to allow the mobile terminal MTB to replicate locally the session state at the time of suspension. The gateway 40 then forwards to the mobile terminal MTB any information which had been stored in memory from the host computer HOSTA. In addition, the gateway 40 proceeds to reconfigure its virtual circuit tables such that information which is received from the host computer HOSTA destined for the transitional session on the mobile terminal MTA via the link 520a (FIG. 15) is redirected to the mobile terminal MTB via the link 522. Similarly, then, packets received from the mobile terminal MTB via the link 522 established in step 562 are forwarded by the gateway 40 to the host computer HOSTA via the link 520b.

Accordingly, the mobile terminal MTB may resume and carry on the session with the host computer HOSTA previously conducted between the mobile terminal MTA and the host computer HOSTA. Thus, the system returns to step 542 and communications are conducted between the mobile terminal MTB and the host computer HOSTA with the gateway 40 serving as the intermediary. Should the mobile terminal MTB later choose to suspend the session (steps 544,546), another mobile terminal such as the original mobile terminal MTA may be used to resume the session in the manner discussed above in connection with steps 560 and 562. In this case, the roles of the mobile terminals MTA and MTB are reversed.

In another embodiment, the mobile terminal MTB in step 562 only has information regarding the particular gateway 40 which is responsible for the suspended session (either by default or pre-determined knowledge). The gateway 40 then provides the mobile terminal MTB with a list of currently suspended sessions from which to choose as part of step 562. Alternatively, the gateway 40 may be configured so as to have suspended at any one time only one session which is automatically resumed on behalf of the requesting mobile terminal.

Figure 17A:
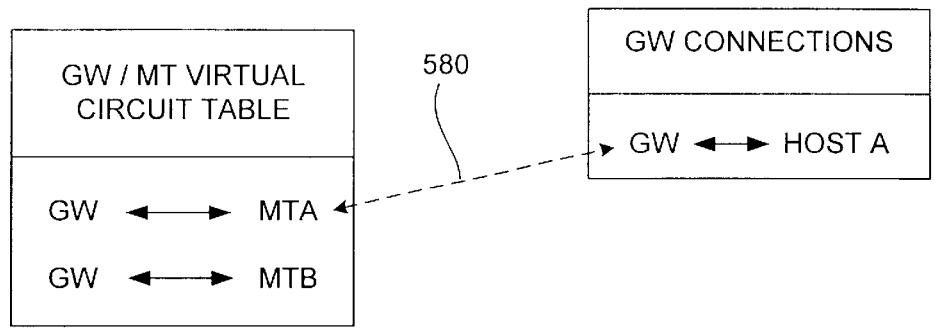
FIGS. 17a–17c represent schematically the connections provided between the gateway and the mobile terminals as a connection is suspended and resumed in accordance with the present invention.

FIG. 17a illustrates schematically the connection tables within the gateway 40. The GW/MT virtual circuit table includes the connections established between the gateway 40 and the mobile terminal MTA (step 540) and the gateway 40 and the mobile terminal MTB (step 560). The GW connection table includes the connection between the gateway 40 and the host computer HOSTA established in step 540. The dashed line 580 illustrates the translation performed by the gateway 40 for communications between the mobile terminal MTA and the host computer HOSTA via the established session.

Figure 17B:
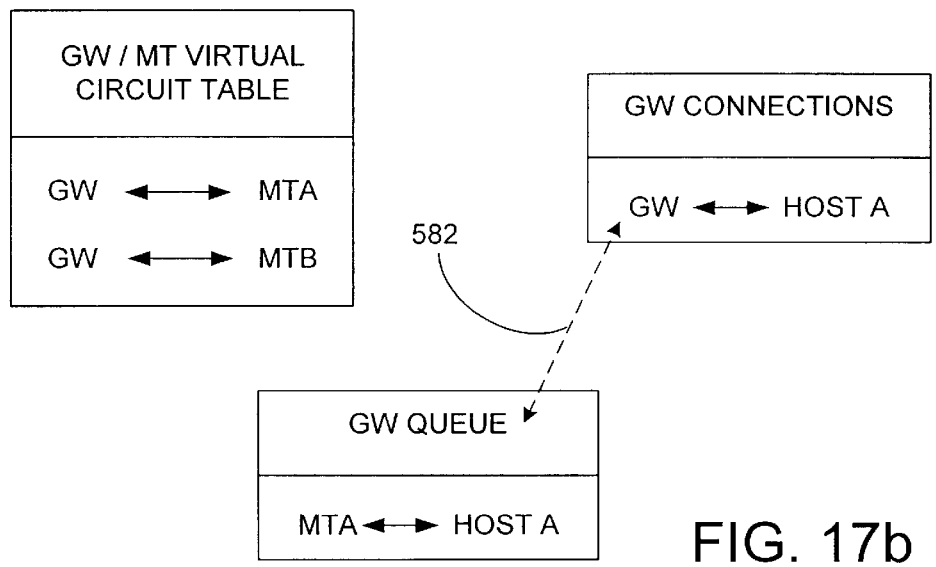
Figure 17C:
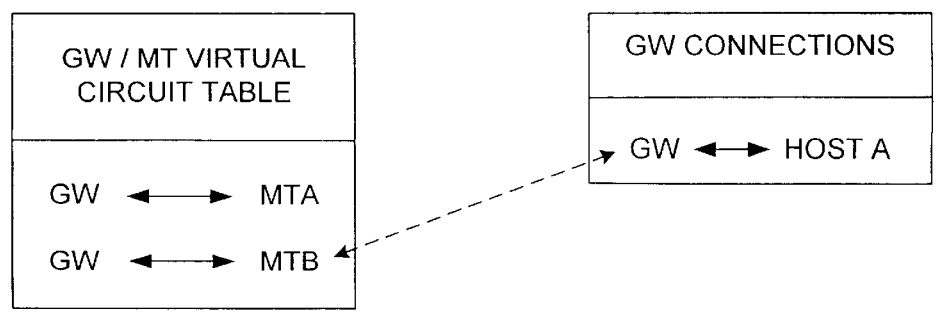

FIG. 17b represents the situation where the mobile terminal MTA has requested that the session be suspended (steps 544, 546) and the gateway 40 queues in memory information received from the host computer HOSTA and directed to the mobile terminal MTA (step 548). Dashed line 582 represents the manner in which the information is stored directly in memory by the gateway 40. FIG. 17c illustrates the manner in which the gateway 40 reconfigures itself to perform the necessary translation such that communications occur between the host computer HOSTA and the mobile terminal MTB (step 566). It is noted that as far as the host computer HOSTA is concerned, the same session is maintained despite the change in mobile terminals.

It will be appreciated that the invention has been described in the context of suspending a session which is part of a virtual circuit. In another embodiment, an entire virtual circuit can be suspended (including all sessions therein) by applying the same principles. Accordingly, as referred to herein a session is intended to be given an interpretation broad enough to cover virtually any type of established connection unless expressly used otherwise. As will be appreciated, a particular number of levels in a given communication link is not necessary to the present invention, and hence a session will be used to refer broadly to a communication link.

Although the invention has been shown and described with respect to certain preferred embodiments, it is obvious that equivalents and modifications will occur to others skilled in the art upon the reading and understanding of the specification. For example, while the preferred embodiment utilizes three different layers for the virtual circuit (i.e., VCID, SID and SOID), it will be appreciated that some other number could also be used (e.g., 1, 2, 4, etc.).

Further, the present invention has been described with respect to wireless mobile devices utilizing RF to communicate with devices connected to the network backbones. However, the scope of the present invention also includes mobile devices which do not use RF to communicate but rather are physically connected and disconnected from each respective network backbone via a wired network connection, for example.

Additionally, although the present invention was described with a network having discrete components such as the gateway 40, host 42, and DNS 44, it will be appreciated that all of these components could have been combined to form a single unit which can carry on the functionalities described herein.

The present invention includes all such equivalents and modifications, and is limited only by the scope of the following claims.

What is claimed is:

1. A communication system, comprising:

a network backbone;

a gateway controller, operatively coupled to the network backbone, for serving as an intermediary for communications between mobile terminals and devices coupled to the network backbone through respective communication sessions;

a first mobile terminal operative to establish a communication session with a device coupled to the network backbone through the gateway controller, the first mobile terminal being configured to request selectively that the gateway controller suspend the communication session, and the gateway controller being configured to carry out such request; and the gateway controller being further configured to accept a request from a second mobile terminal and to cause the suspended communication session to be resumed between the device and the second mobile terminal without requiring that the communication session be terminated from the perspective of the device and without the device being aware that the communication session has been suspended with the first mobile terminal and resumed with the second mobile terminal.

2. The communication system of claim 1, wherein the first mobile terminal and the second mobile terminal each comprise at least one of a data terminal, a telephone and a pager.

3. The communication system of claim 1, wherein the gateway controller establishes first and second connections with the first mobile terminal and the second mobile terminal, respectively, and a third connection with the device, and wherein communications involving the first and third connections are replaced by communications involving the second and third connections as part of the suspending and resuming of the communication session.

4. The communication system of claim 3, wherein at least the first connection and the second connection involve wireless transmissions.

5. The communication system of claim 1, further comprising a server connected to the network backbone responsible for maintaining a listing of suspended sessions and corresponding gateway controllers.

6. A method of carrying out communications within a system including a network backbone; and a gateway controller, operatively coupled to the network backbone, for serving as an intermediary for communications between mobile terminals and devices coupled to the network backbone through respective communication sessions, the method comprising the steps of:

a first mobile terminal establishing a communication session with a device coupled to the network backbone through the gateway controller, the first mobile terminal requesting that the gateway controller suspend the communication session, and the gateway controller carrying out such request; and the gateway controller accepting a request from a second mobile terminal to cause the suspended communication session to be resumed between the device and the second mobile terminal without requiring that the communication session be terminated from the perspective of the device and without the device being aware that the communication session has been suspended with the first mobile terminal and resumed with the second mobile terminal.

7. The method of claim 6, wherein the first mobile terminal and the second mobile terminal each comprise at least one of a data terminal, a telephone and a pager.

8. The method of claim 6, wherein the gateway controller carries out a step of establishing first and second connections with the first mobile terminal and the second mobile terminal, respectively, and a third connection with the device, and wherein communications involving the first and third connections are replaced by communications involving the second and third connections as part of the suspending and resuming of the communication session.

9. The method of claim 8, wherein at least the first connection and the second connection involve wireless transmissions.

10. The method of claim 6, the system further comprising a server connected to the network backbone responsible for maintaining a listing of suspended sessions and corresponding gateway controllers.

11. A gateway controller for use in a communication system including a network backbone and a plurality of mobile terminals communicating with devices coupled to the network backbone via the gateway controller, the gateway controller comprising:

a network interface for coupling the gateway controller to the network backbone;

means for suspending a communication session established between a first of the plurality of mobile terminals and a device coupled to the network backbone; and means for resuming the communication session between a second of the plurality of mobile terminals and the device without requiring that the communication session be terminated from the perspective of the device and without the device being aware that the communication session has been suspended with the first of the plurality mobile terminals and resumed with the second of the plurality mobile terminals.

12. The gateway controller of claim 11, wherein the means for suspending suspends the communication session between the first mobile terminal and the device in response to receiving a request from the first mobile terminal to suspend the communication session.

13. The gateway controller of claim 12, wherein the means for resuming resumes the communication session between the second mobile terminal and the device in response to receiving a request from the second mobile terminal to resume the communication session.

14. A method transferring a communication session between mobile terminals operating in a system including a network backbone, and a gateway controller, operatively coupled to the network backbone, for serving as an intermediary for communication between the mobile terminals and devices coupled to the network backbone, the method including the steps of:

receiving by the gateway controller a request by a first mobile terminal to suspend a communication session between the first mobile terminal and a device coupled to the network backbone;

suspending the communication session between the first mobile terminal and the device coupled to the network backbone;

receiving by the gateway controller a request by a second mobile terminal to resume the suspended communication session; and resuming the suspended communication session between the second mobile terminal and the device without the device being aware that the communication session had been suspended with the first mobile terminal and resumed with the second mobile terminal.

15. The method of claim 14, further including the step of temporarily storing at the gateway controller information received from the device and intended for the first mobile terminal during such time that the communication session is suspended, and transmitting the stored information to the second mobile terminal upon resuming the communication session.

16. The method of claim 14, wherein following the step of resuming the suspended communication session the gateway controller forwards all information received from the device and intended for the first mobile terminal to the second mobile terminal.

17. A communication system, comprising:
a network backbone;
a gateway controller, operatively coupled to the network backbone, for serving as an intermediary for communications between mobile terminals and devices coupled to the network backbone through respective communication sessions;
a first mobile terminal operative to establish a communication session with a device coupled to the network backbone through the gateway controller, the first mobile terminal being configured to request selectively that the gateway controller suspend the communication session, and the gateway controller being configured to carry out such request; and
the gateway controller being further configured to accept a request from a second mobile terminal and to cause the suspended communication session to be resumed between the device and the second mobile terminal without requiring that the communication session be terminated from the perspective of the device;
wherein the gateway controller temporarily stores information received from the device and intended for the first mobile terminal during such time that the communication session is suspended, and transmits the stored information to the second mobile terminal upon resuming the communication session.

18. A communication system, comprising:
a network backbone;
a gateway controller, operatively coupled to the network backbone, for serving as an intermediary for communications between mobile terminals and devices coupled to the network backbone through respective communication sessions;
a first mobile terminal operative to establish a communication session with a device coupled to the network backbone through the gateway controller, the first mobile terminal being configured to request selectively that the gateway controller suspend the communication session, and the gateway controller being configured to carry out such request;
the gateway controller being further configured to accept a request from a second mobile terminal and to cause the suspended communication session to be resumed between the device and the second mobile terminal without requiring that the communication session be terminated from the perspective of the device;

a server connected to the network backbone responsible for maintaining a listing of suspended sessions and corresponding gateway controllers;
wherein the second mobile terminal queries the server prior to requesting the gateway controller to resume the session.

19. A method of carrying out communications within a system including a network backbone; and a gateway controller, operatively coupled to the network backbone, for serving as an intermediary for communications between mobile terminals and devices coupled to the network backbone through respective communication sessions, the method comprising the steps of:
a first mobile terminal establishing a communication session with a device coupled to the network backbone through the gateway controller,
the first mobile terminal requesting that the gateway controller suspend the communication session, and the gateway controller carrying out such request; and
the gateway controller accepting a request from a second mobile terminal to cause the suspended communication session to be resumed between the device and the second mobile terminal without requiring that the communication session be terminated from the perspective of the device;
wherein the gateway controller temporarily stores information received from the device and intended for the first mobile terminal during such time that the communication session is suspended, and transmits the stored information to the second mobile terminal upon resuming the communication session.

20. A method of carrying out communications within a system including a network backbone; and a gateway controller, operatively coupled to the network backbone, for serving as an intermediary for communications between mobile terminals and devices coupled to the network backbone through respective communication sessions, the method comprising the steps of:
a first mobile terminal establishing a communication session with a device coupled to the network backbone through the gateway controller,
the first mobile terminal requesting that the gateway controller suspend the communication session, and the gateway controller carrying out such request;
the gateway controller accepting a request from a second mobile terminal to cause the suspended communication session to be resumed between the device and the second mobile terminal without requiring that the communication session be terminated from the perspective of the device;
wherein the system has a server connected to the network backbone responsible for maintaining a listing of suspended sessions and corresponding gateway controllers and the second mobile terminal queries the server prior to requesting the gateway controller to resume the session.

21. A method of carrying out communications within a system including a network backbone; and a gateway controller, operatively coupled to the network backbone, for serving as an intermediary for communications between mobile terminals and devices coupled to the network backbone through respective communication sessions, the method comprising the steps of:
a first mobile terminal establishing a communication session with a device coupled to the network backbone through the gateway controller, the first mobile terminal requesting that the gateway controller suspend the communication session, and the gateway controller carrying out such request;

the gateway controller accepting a request from a second mobile terminal to cause the suspended communication session to be resumed between the device and the second mobile terminal without requiring that the communication session be terminated from the perspective of the device;

wherein the step of the first mobile terminal establishing the communication session with the device comprises the steps of:

the first mobile terminal informing the gateway controller of a willingness to accept communications initiated by the device;

the gateway controller establishing a virtual circuit connection with the first mobile terminal, the gateway controller using the virtual circuit to forward unsolicited information received from the device to the first mobile terminal and to forward information received from the first mobile terminal to the device; and notifying the gateway controller of charges in a network address of the first mobile terminal to permit seamless communications between the first mobile terminal and the device regardless of a change in the network address of the first mobile terminal.

22. The method of claim 21, wherein the first mobile terminal communicates with the gateway controller through at least one wireless link.

23. A gateway controller for use in a communication system including a network backbone and a plurality of mobile terminals communicating with devices coupled to the network backbone via the gateway controller, the gateway controller comprising:

a network interface for coupling the gateway controller to the network backbone;

means for suspending a communication session established between a first of the plurality of mobile terminals and a device coupled to the network backbone;

means for resuming the communication session between a second of the plurality of mobile terminals and the device without requiring that the communication session be terminated from the perspective of the device; and means for temporarily storing information received from the device and intended for the first mobile terminal during such time that the communication session is suspended, and transmitting the stored information to the second mobile terminal upon resuming the communication session.

24. A mobile terminal for use in a communication system including a network backbone and a gateway controller coupled to the network backbone for interfacing the mobile terminal with devices coupled to the network backbone, the mobile terminal comprising:

means for establishing with the gateway controller a communication session between the mobile terminal and a device coupled to the network backbone;

means for requesting the gateway controller to suspend the communication session between the mobile terminal and the device without requiring that the communication session be terminated from the perspective of the device; and means for requesting the gateway to resume with the mobile terminal a previously established communication session between an another mobile terminal and an another device coupled to the network backbone without requiring that the previously established communication session be terminated from the perspective of the another device.

25. The mobile terminal of claim 24, wherein the mobile terminal comprises at least one of a data terminal, a telephone and a pager.

* * * * *

UNITED STATES PATENT AND TRADEMARK OFFICE
CERTIFICATE OF CORRECTION

PATENT NO.    : 6,201,962 B1
DATED         : March 13, 2001
INVENTOR(S)   : Sturniolo, et al.

It is certified that error appears in the above-identified patent and that said Letters Patent is hereby corrected as shown below:

Column 1,
Line 32, replace "used to keep" with -- be used to keep --.

Column 5,
Line 59, replace "riot be wireless" with -- not be wireless --.
Line 67, replace "comprise its own" with -- comprises its own --.

Column 6,
Line 64, replace "between the immoble" with -- between the moble --.

Column 7,
Line 6, replace "and the gateways" with -- and the gateway --.

Column 26,
Line 47, replace "WANs is riot successful" with -- WANs is not successful --.

Column 32,
Line 42, and 43, replace "plurality mobile terminals" with -- plurality of mobile terminals --

Column 35,
Line 23, replace "controller of charges in" with -- controller of changes in --.

Signed and Sealed this

Twenty-eighth Day of August, 2001

*Attest:*

NICHOLAS P. GODICI
*Attesting Officer*    *Acting Director of the United States Patent and Trademark Office*